(12) United States Patent
Evans et al.

(10) Patent No.: US 11,726,048 B2
(45) Date of Patent: Aug. 15, 2023

(54) SAMPLE INSPECTION APPARATUS EMPLOYING A DIFFRACTION DETECTOR

(71) Applicants: THE NOTTINGHAM TRENT UNIVERSITY, Nottingham (GB); CRANFIELD UNIVERSITY, Cranfield (GB)

(72) Inventors: Paul Evans, Nottingham (GB); Keith Rogers, Swindon (GB)

(73) Assignees: The Nottingham Trent University, Nottingham (GB); The Cranfield University, Cranfield (GB)

(*) Notice: Subject to any disclaimer, the term of this patent is extended or adjusted under 35 U.S.C. 154(b) by 0 days.

(21) Appl. No.: 17/945,434

(22) Filed: Sep. 15, 2022

(65) Prior Publication Data

US 2023/0012499 A1    Jan. 19, 2023

Related U.S. Application Data

(60) Division of application No. 17/180,310, filed on Feb. 19, 2021, now Pat. No. 11,467,104, which is a
(Continued)

(30) Foreign Application Priority Data

Feb. 25, 2017 (GB) .................................. 1703077
Feb. 25, 2017 (GB) .................................. 1703078
(Continued)

(51) Int. Cl.
*G01N 23/00* (2006.01)
*G01N 23/20008* (2018.01)
*G01N 23/205* (2018.01)

(52) U.S. Cl.
CPC ..... *G01N 23/20008* (2013.01); *G01N 23/205* (2013.01)

(58) Field of Classification Search
None
See application file for complete search history.

(56) References Cited

U.S. PATENT DOCUMENTS

| 5,008,911 A | 4/1991 | Harding |
| 5,231,652 A | 7/1993 | Harding |

(Continued)

FOREIGN PATENT DOCUMENTS

| CN | 103403580 A | 11/2013 |
| DE | 10 2005 039 642 B3 | 2/2007 |

(Continued)

OTHER PUBLICATIONS

International Search Report dated Jun. 18, 2018 from corresponding International Patent Application No. PCT/GB2018/050467, 6 pages.
(Continued)

*Primary Examiner* — Hoon K Song
(74) *Attorney, Agent, or Firm* — Ruggiero McAllister & McMahon LLC

(57) ABSTRACT

A sample inspection apparatus includes a source of electromagnetic radiation, a beam former for producing a plurality of coaxial and substantially conical shells of radiation, a detection surface and a set of conical shell slot collimators. Each conical shell has a different opening angle. The detection surface is arranged to receive diffracted radiation after incidence of one or more of the conical shells upon the sample to be inspected. The set of conical shell slot collimators is provided at or close to the detection surface which each stare at different annular regions of different corresponding conical shells.

8 Claims, 18 Drawing Sheets

Related U.S. Application Data division of application No. 16/549,028, filed on Aug. 23, 2019, now Pat. No. 10,948,432, which is a continuation of application No. PCT/GB2018/050467, filed on Feb. 22, 2018.

(30) Foreign Application Priority Data

Feb. 25, 2017 (GB) .................................. 1703079
Feb. 25, 2017 (GB) .................................. 1703080

(56) References Cited

U.S. PATENT DOCUMENTS

| | | | |
|---|---|---|---|
| 5,602,893 A * | 2/1997 | Harding | G01V 5/0025 378/86 |
| 5,757,478 A | 5/1998 | Ma | |
| 8,462,913 B2 | 6/2013 | Evans | |
| 9,335,281 B2 | 5/2016 | Marks | |
| 2006/0098773 A1 | 5/2006 | Peschmann | |
| 2006/0251214 A1 | 11/2006 | Unger et al. | |
| 2008/0175350 A1* | 7/2008 | MacDonald | G01N 23/20 378/54 |
| 2009/0010386 A1 | 1/2009 | Peschmann | |
| 2010/0254514 A1* | 10/2010 | Evans | G21K 1/025 250/390.02 |
| 2010/0303206 A1* | 12/2010 | O'Dwyer | G01N 23/20091 378/83 |
| 2013/0208859 A1 | 8/2013 | Evans | |
| 2014/0247920 A1 | 9/2014 | Marks et al. | |
| 2015/0362443 A1 | 2/2015 | Evans | |

FOREIGN PATENT DOCUMENTS

| | | |
|---|---|---|
| EP | 2 171 435 B1 | 4/2010 |
| WO | 2004/074871 A1 | 9/2004 |
| WO | 2005/120354 A1 | 12/2005 |
| WO | 2008/149078 A1 | 12/2008 |
| WO | 2011/158047 A1 | 12/2011 |
| WO | 2014/111684 A1 | 7/2014 |

OTHER PUBLICATIONS

Written Opinion dated Jun. 18, 2018 from corresponding International Patent Application No. PCT/GB2018/050467, 9 pages.
Greenberg, Joel A.; "Coded apertures for faster x-ray scatter imaging"; SPIE Newsroom, Aug. 10, 2016, pp. 1-4.
Great Britain Search Report dated Jul. 18, 2017 from corresponding Great Britain patent application No. GB 1703077.6, 4 pages.
Chinese First Examination Report dated Nov. 14, 2021 from corresponding Chinese Patent Application No. 2018800140874, 17 pages.
Evans et al.; "High Intensity X-ray Diffraction in Transmission Mode Employing an Analog of Posson's Spot"; Applied Physics Letters 97, 204101, 2010, 3 pages.
UKIPO Search Report dated Jul. 18, 2017 from corresponding GB Application No. 1703080.0, 3 pages.
UKIPO Examination Report dated Aug. 18, 2021 from corresponding GB Application No. 1703080.0, 3 pages.

* cited by examiner (a)

(b)

SAMPLE INSPECTION APPARATUS EMPLOYING A DIFFRACTION DETECTOR

CROSS-REFERENCE TO RELATED APPLICATIONS

This application is a divisional of U.S. patent application Ser. No. 17/180,310 filed Feb. 19, 2021, which is a divisional of U.S. patent application Ser. No. 16/549,028 filed Aug. 23, 2019, that issued as U.S. Pat. No. 10,948,432, which is a continuation of International Application PCT/GB2018/050467 filed Feb. 22, 2018, which claims the benefit under 35 U.S.C. § 119 to Great Britain Application Nos. 1703077.6, 1703078.4, 1703079.2 and 1703080.0, all filed Feb. 25, 2017, the entire contents of all of which are incorporated herein by reference.

BACKGROUND OF THE DISCLOSURE

1. Field of the Disclosure

The present disclosure relates to a sample inspection apparatus employing a diffraction detector. The diffraction detector may be for detection of scattered electromagnetic radiation, including X-rays.

2. Description of Related Art

It is well known to interrogate samples with X-rays. A typical arrangement will comprise an X-ray source and a detector, with a sample between them. Radiation which is incident on the sample is referred to as "incoming" radiation and radiation emanating from the sample is referred to as "outgoing" radiation.

X-ray absorption imaging is well established for producing images of the inside of objects in various public and commercial fields such as security scanning of luggage and other objects, and in various medical imaging fields. Different materials attenuate X-rays to different degrees and these differences form the basis for imaging different objects.

In addition to imaging, it is also desirable to determine materials or chemicals are present in an inspected object. X-ray absorption imaging can provide some basic material discrimination, but only in the cases where a material can be identified based on its absorption characteristics.

As well as interacting with matter through absorption, X-rays also interact with matter through elastic (Rayleigh) and inelastic (Compton) scattering processes. In an elastic scattering process, an outgoing X-ray has the same wavelength as an incoming X-ray and so a diffraction pattern produced by the scattered radiation can be used to determine the lattice structure and thus material identity of the matter of the sample which is under inspection. This technique is commonly referred to as X-ray crystallography.

The amount of radiation that is scattered is relatively low as compared with the amount of radiation that is available for absorption imaging, and therefore the intensity of the X-ray radiation being measured in conventional X-ray crystallography is relatively low, requiring long integration periods to accumulate a sufficient amount of signal for accurate measurement. For this reason, X-ray crystallography is a relatively slow technique and is primarily used in laboratories for slow analysis of materials, but is not generally suitable for interrogating everyday objects or for use in "real time" or "on-line" inspection applications.

Indeed, the two fields of X-ray imaging by absorption and X-ray crystallography are not normally seen as being closely related. As well as the differences between one being much slower and confined to the laboratory, X-ray crystallography looks at the scatter of X-rays whereas X-ray absorption looks at the primary beam, with each technique disregarding the portion of the radiation considered by the other.

An improved apparatus for detection of X-ray scattering is disclosed in WO 2008/149078, which is hereby incorporated by reference. Here, the height at which a "hotspot" formed by the intersection of overlapping Debye cones is determined, and that height provides information about the Bragg scattering angle of a sample under inspection.

The possibility to combine scattering and absorption data is described in WO 2011/158047, which is hereby incorporated by reference.

A further scheme for sampling caustic rims formed by Debye rings is described in WO 2014/111684, which is hereby incorporated by reference.

Even with these improvements there is still a need for further developments in the art.

SUMMARY OF THE DISCLOSURE

According to a first aspect of the disclosure there is provided a sample inspection apparatus comprising: a source of electromagnetic radiation; a beam former for producing a substantially conical shell of radiation, said conical shell being incident on a sample to be inspected; a detection surface arranged to receive diffracted radiation after incidence of the conical shell beam upon the sample to be inspected; an unfocused collimator provided at or close to the detection surface and having a grid structure formed of cells which each stare at different portions of the conical shell.

Optionally, the grid structure of the noise filtering collimator comprises a cut-out portion allowing the formation of a self-collimating hotspot of diffracted radiation.

Optionally, the grid structure comprises lamellae which intersect to form the cells.

Optionally, the lamellae comprise a set of radial lamellae and a set of concentric lamellae with spaces therebetween forming a set of cells.

Optionally, additional radial lamellae are provided at one or more successively more outward portions of the grid structure.

Optionally, the sample inspection apparatus comprises an occluder which extends from a position close to or in contact with an exit side of the sample to a point which is close to the detection surface.

According to a second aspect of the disclosure there is provided a sample inspection apparatus comprising: a source of electromagnetic radiation; a beam forming collimator for producing a substantially conical shell of radiation, a first radiation detector arranged to receive diffracted radiation after incidence of the conical shell beam upon a sample to be inspected; a coded aperture provided at a detection surface of the first radiation detector; and a range detector which is arranged to collect radiation transmitted through the coded aperture.

Optionally, the coded aperture is provided at a point where a radiation hotspot is expected to form.

Optionally, the coded aperture is provided at a position along a symmetry axis of the apparatus.

Optionally, the sample inspection apparatus comprises a coded aperture mask providing a plurality of apertures, and central occluder provided at one or more of the apertures of the coded aperture mask to eliminate stray illumination.

Optionally, the sample inspection apparatus comprises a system for storing and analysing data that is collected by the first radiation detector and/or the range detector.

Optionally, the coded aperture and the first radiation detector are integrated.

Optionally, a body of an aperture comprises angled sidewalls that taper towards a centre point. This aperture could be the "aperture" according to the main aspect, or one or more of the apertures which are provided as part an aperture mask.

According to a third aspect of the disclosure there is provided a sample inspection apparatus comprising: a source of electromagnetic radiation; a beam former for producing a substantially conical shell of radiation, said conical shell being incident on a sample to be inspected; a radiation detection system arranged to receive diffracted radiation after incidence of the conical shell beam upon the sample to be inspected; wherein the radiation detection system comprises a multi-planar detection surface.

Optionally, the radiation detection system comprises a plurality of detectors providing detection surfaces which are inclined with respect to each other.

Optionally, the plurality of detectors are in a tiled arrangement.

Optionally, an aperture is provided, being formed in a space between neighbouring tiled detectors.

Optionally, the sample inspection apparatus comprises a further detector arranged to detect radiation passing through said aperture.

There can also be provided a "further detector" which is arranged to detect radiation passing through an aperture which is provided in a monolithic detection surface, formed for example of a curved detector.

According to a fourth aspect of the disclosure there is provided a sample inspection apparatus comprising: a source of electromagnetic radiation; a beam former for producing a plurality of coaxial and substantially conical shells of radiation, each conical shell having a different opening angle; a detection surface arranged to receive diffracted radiation after incidence of one or more of the conical shells upon the sample to be inspected; and a set of conical shell slot collimators provided at or close to the detection surface which each stare at different annular regions of different corresponding conical shells.

Optionally, the sample inspection apparatus comprises a collimator body comprised of a material that substantially blocks the electromagnetic radiation and in which is formed a plurality of channels which are transparent to the electromagnetic radiation and are arranged to provide said set of conical shell slot collimators.

Optionally, a detector which provides said detection surface is an energy-resolving detector.

Optionally, the beam former comprises a set of focused circular or conical shell slits formed in an otherwise beam blocking material.

Optionally, the beam former comprises an optical element arranged to receive radiation from said source of electromagnetic radiation to form conical bands of radiation.

Optionally, each conical shell of radiation originates from a different position along a symmetry axis of the apparatus.

Optionally, diffracted flux collection heights and/or two-theta angles conical shell slot collimators are chosen such that each conical shell slot collimator receives diffracted flux from a sample which is produced by just one of the conical shell beams.

BRIEF DESCRIPTION OF THE DRAWINGS

The disclosure will be described below, by way of example only, with reference to the accompanying drawings, in which.

DETAILED DESCRIPTION OF THE DISCLOSURE

A small portion of an incoming, or "primary", X-ray beam incident onto a crystal is scattered at measurable angles if its wavelength is similar to the lattice distances (or d-spacing) present in the crystalline material under inspection. For ideal, polycrystalline materials interrogated by pencil beams, the photon scatter follows a cone distribution, with the source of the scattering at the cone apex. These "Debye cones" form substantially circular patterns when they intersect a flat detector or other surface normally. The circles forming these patterns have a common centre coincident with that of the incident beam position on the detector. The angular distribution of the scattered intensity is unique to each different crystal structure and thus can be used to identify a material and determine characteristics such as lattice dimensions, crystallite size and percentage crystallinity. The key relationship between the lattice spacing (d), and the angle (θ) subtended by the diffracted or scattered radiation from a plane of atoms inside a crystal is embodied within the well-known Bragg condition: $n\lambda=2d \sin \theta$, in which λ is the wavelength of the incoming radiation and (n) is an integer. The angle subtended by the diffracted or scattered radiation and the interrogating or primary radiation is 2θ (two theta).

Figure 1:
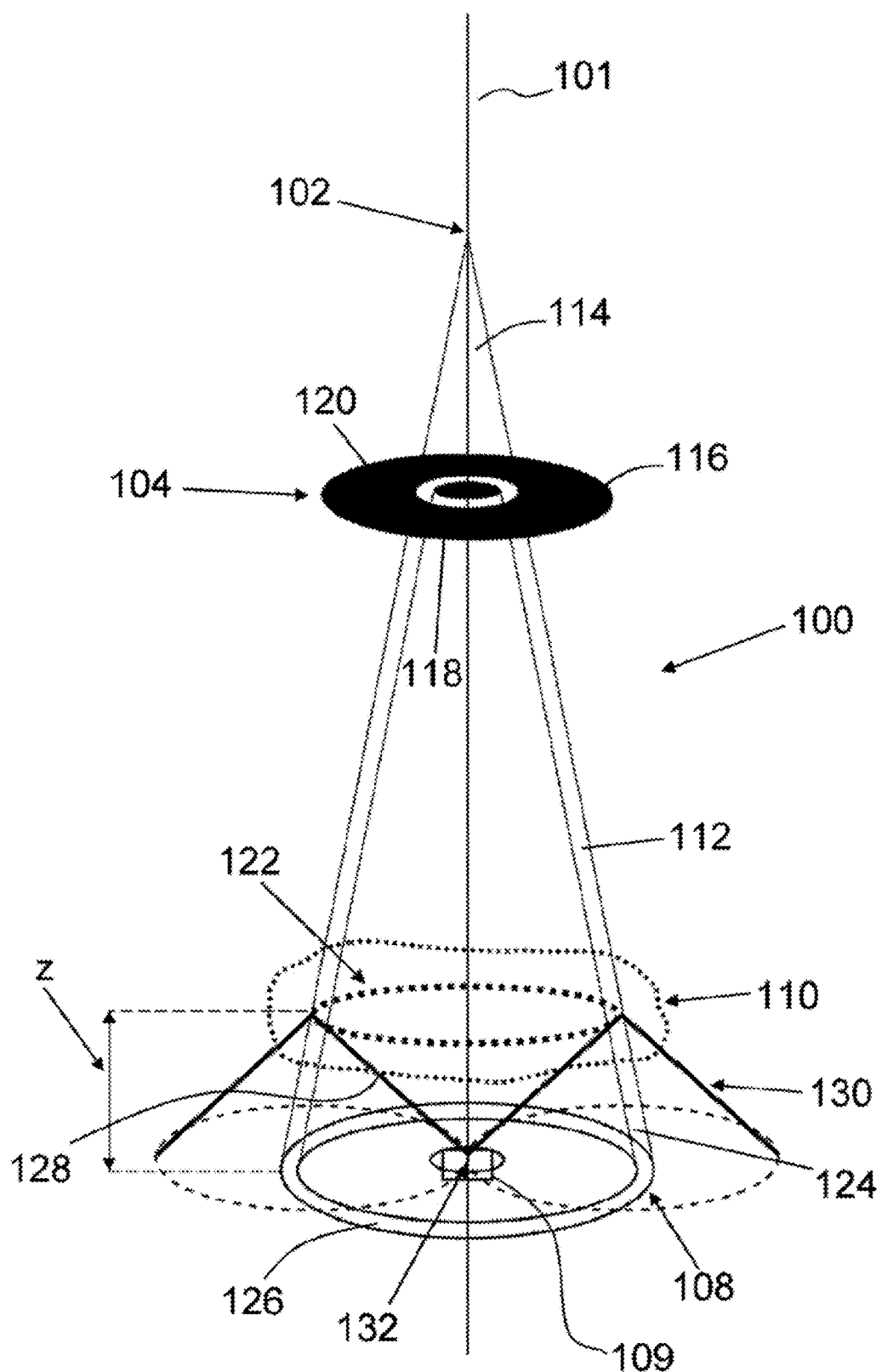
FIG. 1 illustrates a prior art X-ray scattering detection apparatus.

FIG. 1 shows an example of a known apparatus 100 for gathering scattered X-ray radiation. The apparatus 100 comprises an X-ray source 102, a collimator 104, and a detection surface 108 which includes a detector or sensor (not shown). In use, a target object 110 is interposed between the X-ray source 102 and the detection surface 108. Here, a portion of the target object 110 is represented by the dotted lines.

The collimator 104 then produces a conical shell of X-ray radiation 112 upon incidence of a cone 114 of X-rays which is produced by the X-ray source 102. A cross section of the conical shell 112 taken transverse to a primary axis 101 (z-axis) of X-ray radiation will comprise a narrow annulus of X-rays, that is, the X-rays are present in the shape of a band between a first outer cone and a second inner cone that share a common primary axis but can have different opening angles.

The collimator 104 can comprise a ring collimator and can be made from a conventional material that might typically be used for collimating X-rays, such as tungsten or steel. Any material can be used so long as it can significantly block the path of X-rays. In the illustrated implementation, the collimator 104 comprises a first annulus 116 of material and a circular disc 118 of material with a diameter smaller than an inner diameter of the solid annulus 116 and located within it, thus forming an annular aperture 120 between the disc 118 and annulus 116. All three of the annulus 116, annular aperture 120 and disc 118 have the same centre point. The disc 118 can be held in its position relative to the annulus 116 by any appropriate means such as being attached via thin wires or by being held in place using electromagnets. It will be appreciated that any kind of arrangement is possible so long as an aperture is provided which produces a conical shell 112 of X-ray radiation. When a cone 114 of X-ray radiation is incident on the collimator 104, X-rays pass through the aperture 120 but are blocked by the other parts of the collimator 104, producing a conical shell 112 of X-ray radiation.

The target object 110 is the target from which the apparatus 100 is designed to detect diffracted X-rays. The target object 110 can be of numerous forms but in the example depicted in FIG. 1 it is a plate like object which has a width larger in diameter than the curtain 112, but does not have a substantial depth.

In this embodiment detection surface 108 comprises a physical surface, but alternatively it can merely be a name given to a plane of a hypothetical surface with no solid surface present. A sensor 109 can be provided at the detection surface 108. The sensor 109 can be located at the centre of the surface 108 directly in line with the primary axis of the X-ray source.

The conical curtain 112 hits the target object 110. Since the target object 110 is substantially planar, the conical curtain 112 hits the object 110 in a circular target path 122. Some of these X-rays will be scattered by the lattice of the target object 110 by Bragg diffraction and some absorbed, but much of the primary X-ray radiation will continue. A substantially continuous X-ray curtain 124 is then incident upon the detection surface 108 a distance Z from the target object 110, forming an annulus of primary X-rays 126 at that surface 108.

In the embodiment described the sensor 109 is present at the centre of the surface 108 and has a radius sufficiently small that it is contained within the inner radius of annulus 126 such that none of the primary X-ray beam is detected by the sensor 109.

Because the target object 110 contains a polycrystalline material with a certain d spacing there is X-ray diffraction causing a scatter of the photons in a conical distribution. As mentioned above these are known as 'Debye cones' and they are generated from every point along the circular target path 122 so long as the crystal structure is present. Two such Debye cones 128, 130 are shown in FIG. 1. It is found that a small area of concentrated radiation can be generated at a centre point 132 of the detection surface 108 if the distance Z is set correctly. This small area of concentrated radiation is referred to herein as a hotspot. The sensor 109 is arranged to be coincident with the centre point 132, or other part of the detection surface 108 where the formation of a hotspot can be expected.

It is to be noted that Bragg's condition can be satisfied simultaneously by more than one wavelength, so if a broadband/polychromatic source is used together with an energy resolving sensor (to calculate wavelength), then hotspots could occur at different z positions or at a plurality of z positions, and multiple hotspots can occur at a single position.

FIG. 2 illustrates a superposition of the cross-sections of some Debye cones from the target object 110 at the detection surface 108 for three different values of the distance Z shown in FIG. 1. For ease of illustration the footprint of the Debye cones are shown as being circular. This implies that the Debye cones emanate from a fixed height from the detector and result from a cylindrical curtain 112 of primary X-rays. In fact, the cross section of Debye cones will be elliptical. However, this does not change the working principle of the apparatus as described herein, and circular patterns are shown for clarity of illustration.

Figures 2A, 2B, 2C:
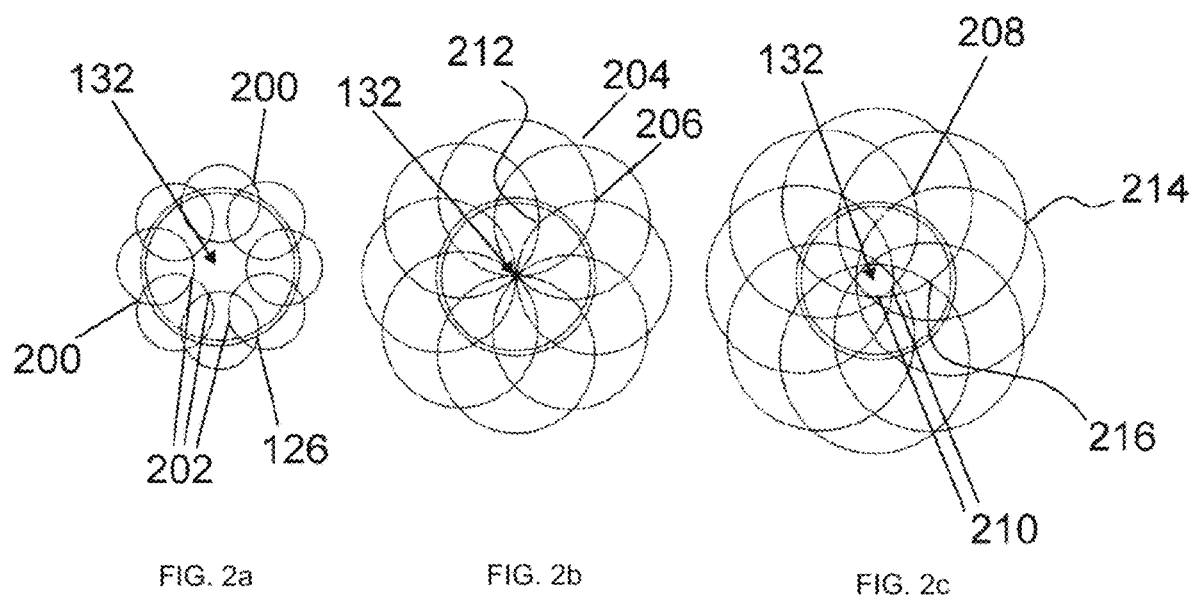
FIGS. 2a, 2b, and 2c illustrate the formation of Debye cones of diffracted radiation formed by a collimator such as that seen in FIG. 1.

In all three examples the annulus of primary X-rays 126 is illustrated for comparison purposes. In FIG. 2a, the detection surface 108 is at a distance Z=z1 where the diameters of the Debye cones are still significantly smaller than the diameter of the circular target path 122. The Debye cones produce a series of circles which in practice will be continuous but only a small selection are shown here for illustrative purposes. At certain points 200, 202 the circles overlap thus increasing the intensity at those points to approximately double elsewhere on the circle and forming two rings of relatively increased intensity, referred to herein as rims. However, there are no circular paths through the centre 132, resulting in an approximately zero intensity of X-rays at the centre point 132, where a sensor 109 is present.

In FIG. 2b the detection surface 108 is at a distance Z=z2 where the diameters of the Debye cones are equal to the diameter of the circular target path 122. In FIG. 2b there are numerous overlapping points such as points 204, 206 where two or three cones coincide increasing the intensity of X-ray radiation at those points. However, all of the cones contribute to the intensity at the very centre 132 of detection surface 108 and form a hotspot where the sensor 109 is present. Accordingly, the intensity of radiation at this point is greatly increased.

In FIG. 2c, the detection surface 108 is at a greater distance Z=z3 where the diameters of the Debye cones are now significantly larger than the diameter of the circular target path 122. In this example there are several points of overlap between the circles of the Debye cones such as points 208, 210. However, there is no point at which all of the cones are coincident. None of the circles pass through the centre point 132 and therefore there is approximately zero intensity of X-rays in the centre 132 where the sensor 109 is present.

Accordingly, there is substantially zero X-ray radiation detected at the sensor 109 at the centre point 132 in FIGS. 2a and 2c whilst there is a great intensity from each of the cones, forming a hotspot at a single point at the centre point 132 in FIG. 2b.

Therefore, the distance Z between the target object 110 and the detection surface 108 at which a hotspot is formed at the centre point 132 acts as a measure that can help determine the identity of a material of the target object 110. This is because the distance Z corresponds to the scattering angle of the material and therefore is indicative of the material forming the target object 110. The distance can be adjusted by moving any of the target object 110, collimator 104 or detection surface 108 until the maximum radiation intensity is found.

Figure 3:
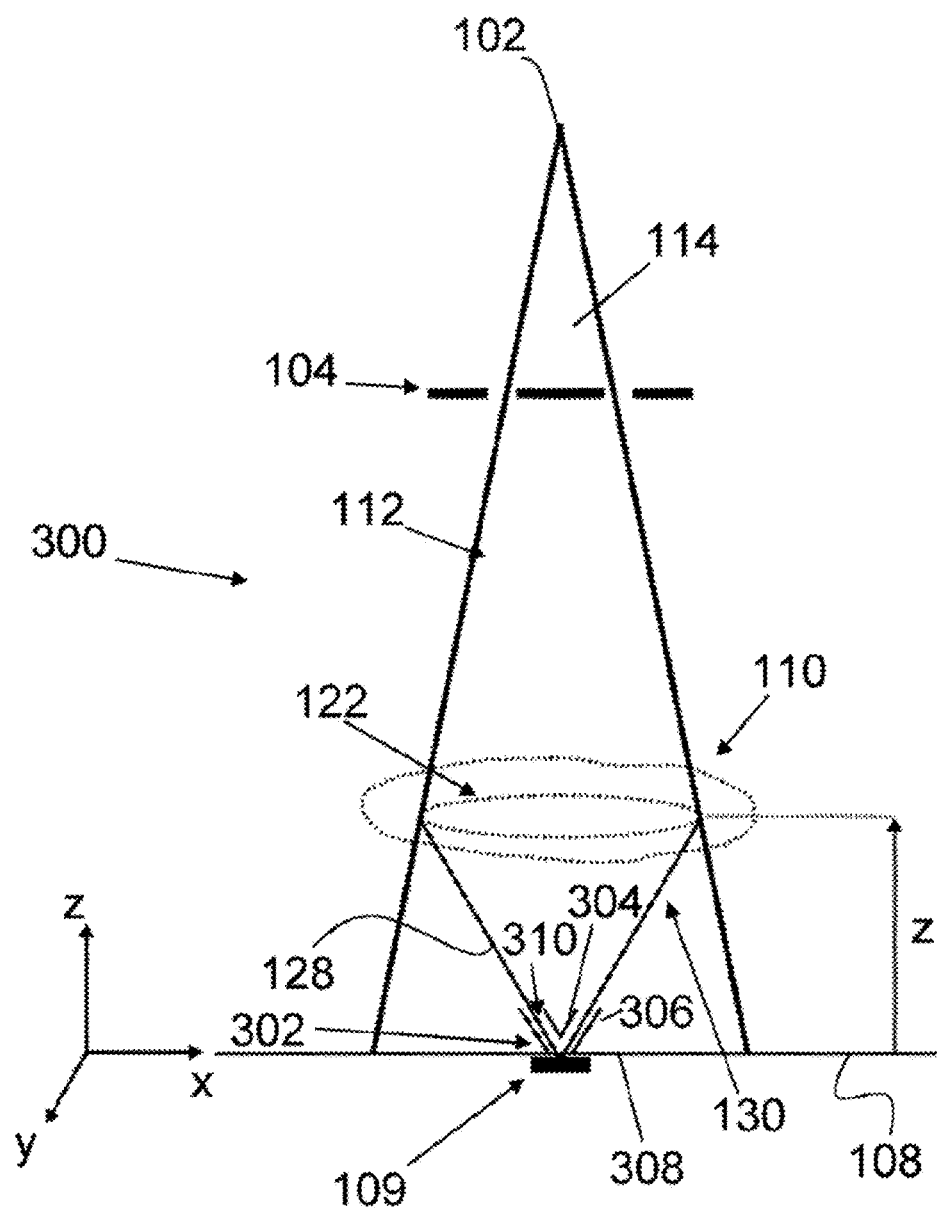
FIG. 3 illustrates another prior art X-ray scattering detection apparatus, with a collimator structure.

FIG. 3 shows another example apparatus 300 for gathering scattered X-ray radiation. This apparatus shares common features with the apparatus 100 of FIG. 1 and so like components are illustrated with like reference numerals. This version is provided with a focused sensor collimator 302 positioned a short distance above the detection surface 108. This collimator 302 comprises a first small cone 304, a larger diameter cone 306 and side portions 308. The cones 304, 306 are configured so that the smaller one 304 is inside the larger 306, providing a channel 310 between them, which has a substantially annular footprint at the detection surface. The sensor collimator 302 is formed of material that blocks X-rays and can suitably be formed from the same material as the source collimator 104. It prevents X-rays hitting the sensor 109 except via the channel 310.

The cones 304, 306 each have a vertical cross section which is V shaped as shown in FIG. 3. The angle of the cone side walls is chosen to focus incoming radiation at a range Z from the surface 108 along the conical curtain 112 which coincides with the target annulus 122. The collimator 302 acts to block X-rays from hitting the sensor 109 that are not parallel with and coincident with the channel 310.

This apparatus 300 is useful where the target object 110 is not in a convenient substantially planar form. As soon as the target object has a significant depth there will be scatter occurring throughout its depth. Accordingly, further Debye cones will be produced going through the depth of the target object 110 which could produce cones which fall on the detector 109 and which can confuse the analysis. Accordingly, the sensor collimator 302 helps cut out Debye cones originating from any point other than distance Z. Additionally, it will help to cut out any Debye cones caused by other materials apart from a material which is being tested for. If the object 110 contains the main desired material which is aimed to be identified but also one or more other polycrystalline materials, there can be further sets of Debye cones from the other materials at different angles. These should also be cut out by the sensor collimator 302.

Figure 4:
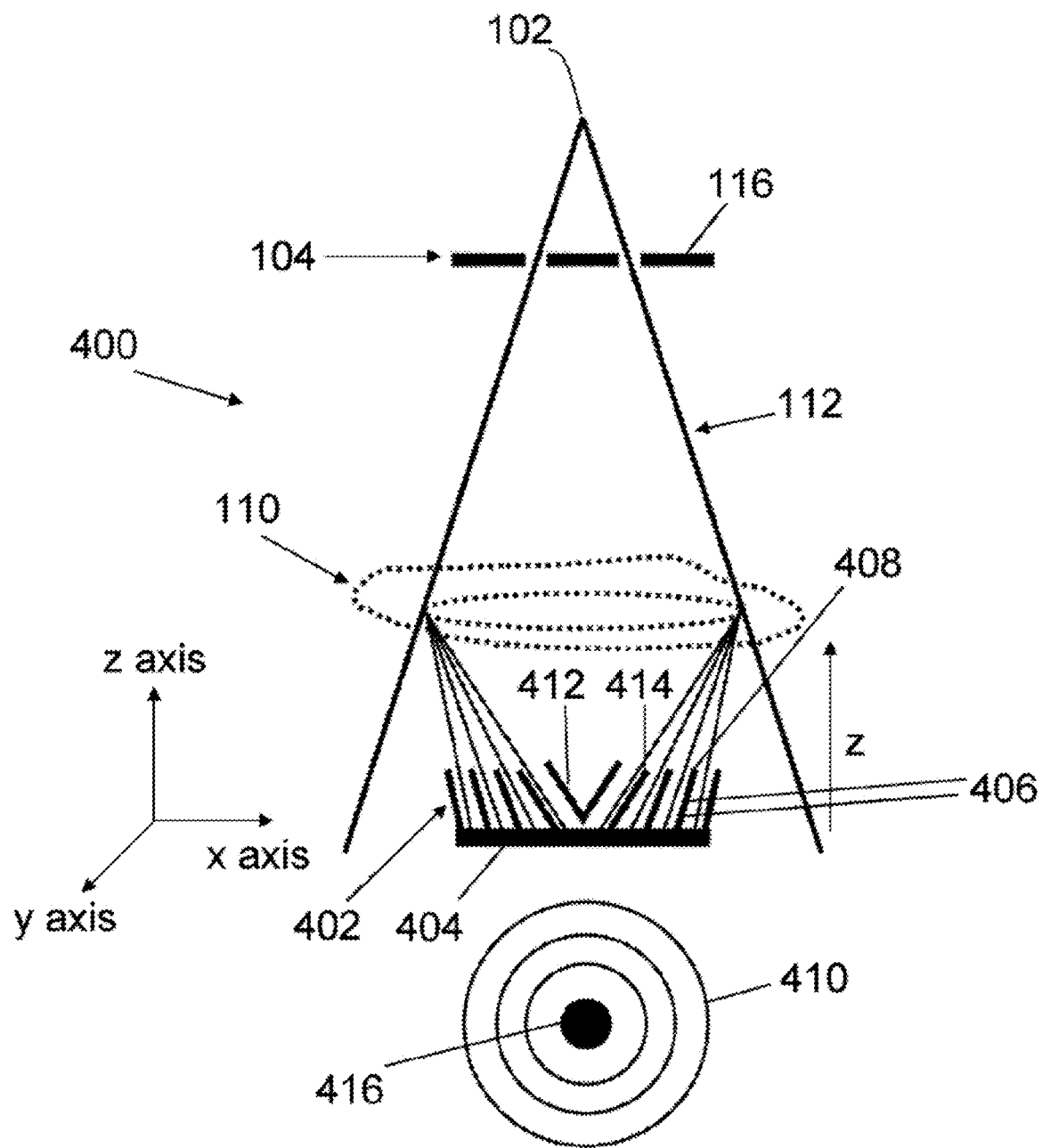
FIG. 4 illustrates another prior art X-ray scattering detection apparatus, with an alternative collimator structure.

FIG. 4 shows a further apparatus 400 for gathering scattered X-ray radiation. This apparatus shares common features with the apparatus 100 of FIG. 1 and so like components are illustrated with like reference numerals.

The apparatus 400 comprises a collimator 402 and a detector 404. The collimator 402 can be provided on the surface of the detector 404 or can be provided just above it. The collimator 402 comprises a series of cones 406 of increasing diameter and decreasing angle with channels 408 between the neighbouring cones 406. The channels have a substantially annular footprint provided at the detection surface provided by the detector 404. The detector 404 can comprise circular sensors 410 located at the bottom of each channel 408 in between each of the cones 406.

Each channel 408 is configured to collimate radiation from a given distance along the z-axis from the detection surface 108 formed by the sensor 404, with each channel 408 being configured to collect scattered radiation at different angles corresponding to different Debye cones.

Only Debye cones collected by the most central channel between central cones 412 and 414 will result in a hotspot 416 with great intensity but the annular detectors in each of the subsequent channels will still detect radiation from Debye cones and preferably are configured to detect a ring of Debye cone intersections. Rings of Debye cone intersections can also be referred to as caustic curves, or simply caustics. A caustic comprises an envelope of a family of curves, formed by overlapping Debye rings, in the plane of the detector. Therefore, the shape of the caustic is a curve, which is tangent to each member of a family of Debye rings at some point.

The apparatus 400 of FIG. 4 can be used when it is primarily intended to identify and quantify a particular polycrystalline material within the target object 110.

Whilst the structures of FIGS. 3 and 4 provide some advantages, they have a fixed working range which is also relatively narrow, and interrogating a relatively large inspection volume such as security luggage screening or diagnostic imaging cannot be achieved in a practical system.

In the structures of FIGS. 3 and 4 where no collimation is provided, the range to the sample must also be known a priori. Collimation enables the detectors to stare at a known position along the conical shell beam in order for the diffraction angle, two-theta, to be known and d-spacings to be calculated. The wavelength must also be known by either monochromising the primary beam or by using an energy resolving detector.

Figure 5:
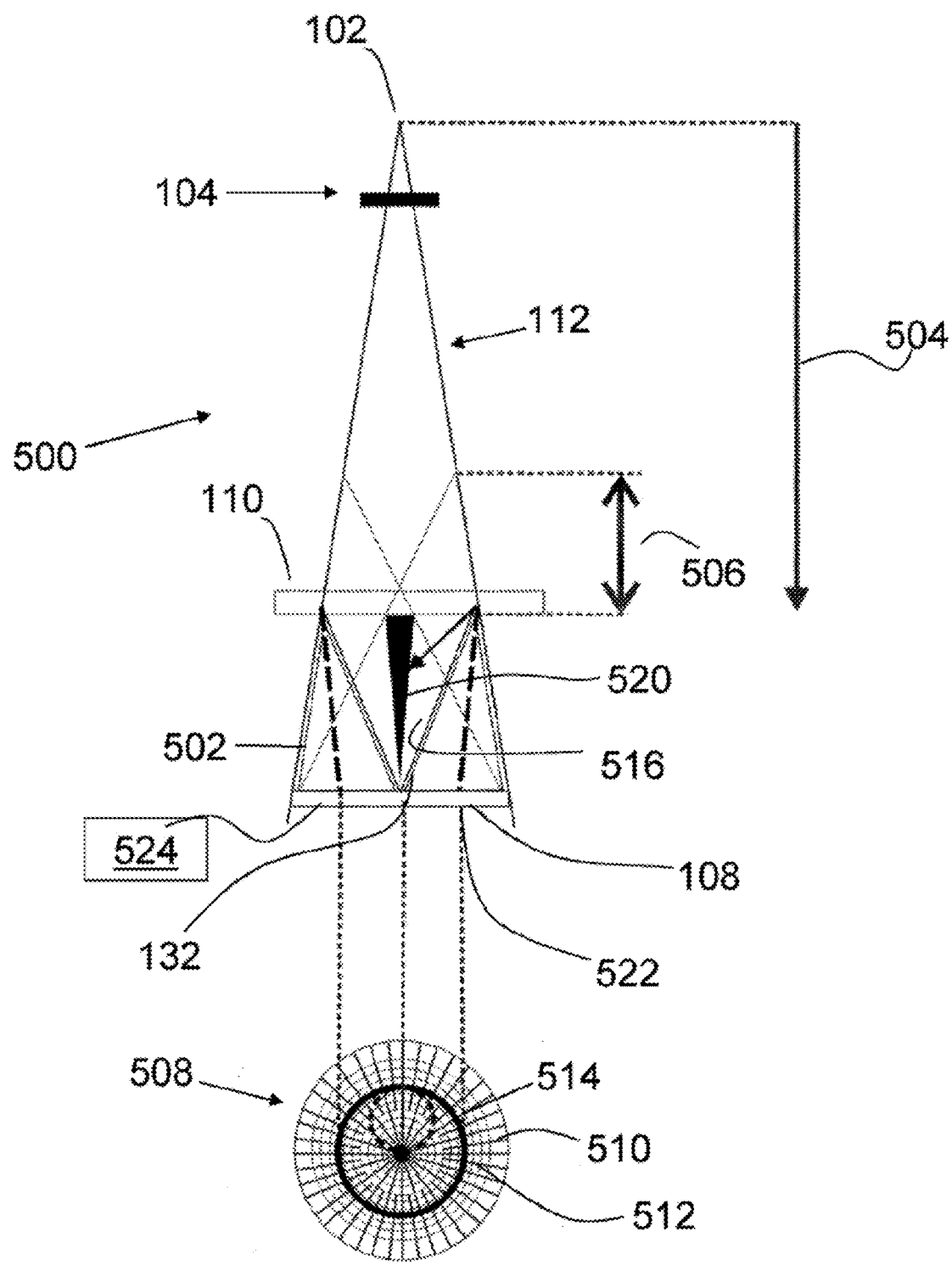
FIG. 5 illustrates a sample inspection apparatus according to an embodiment of the disclosure, the top part showing a cross-sectional view through a symmetry axis and the bottom part showing a plan view.

FIG. 5 shows an improved apparatus 500 for gathering scattered X-ray radiation according to an embodiment of the disclosure. This apparatus shares common features with the apparatus 100 of FIG. 1 and so like components are illustrated with like reference numerals.

The apparatus 500 includes a beam former 104 for producing a substantially conical shell of radiation. This can comprise a collimator as mentioned above with respect to FIG. 1; but there are other types of structures which can produce conical shell radiation and can be referred to generally as beam formers. Example types of beam formers include masks, of which the above annular collimator is one example, or wave guide type devices such as polycapillary optical elements which comprise a bundle of capillary optical elements arranged to form a radiation spot formed by the divergence of beams from the bundle.

Here, the apparatus 500 is provided with a collimator 502 and optionally with an occluder 520 that is formed of suitable material to block or substantially attenuate X-ray radiation, such as tungsten or lead antimony alloy.

The apparatus 500 is for interrogating a sample which can be at a representative object range 504. The range 504 can either be known in advance or restricted, optionally to within a given working envelope 506, representing a set of values of the range over which the apparatus 500 can function.

The collimator 502 comprises a grid structure which is designed to constrain the incidence of electromagnetic radiation. The walls of the grid are referred to herein as lamellae or septa. The lamellae comprise relatively thin plates of material, and are formed from suitable material to block or substantially attenuate X-ray radiation, such as tungsten or lead antimony alloy. However, because they are only subject to scattered radiation they can be relatively thin compared to the thickness of material which is required to block or attenuate primary radiation as is required for example by the ring collimator 104. As a non-limiting example, the lamellae could have a thickness of the order of 0.1 mm to 1 mm and a height of the order 1 cm to 30 cm.

Figure 6:
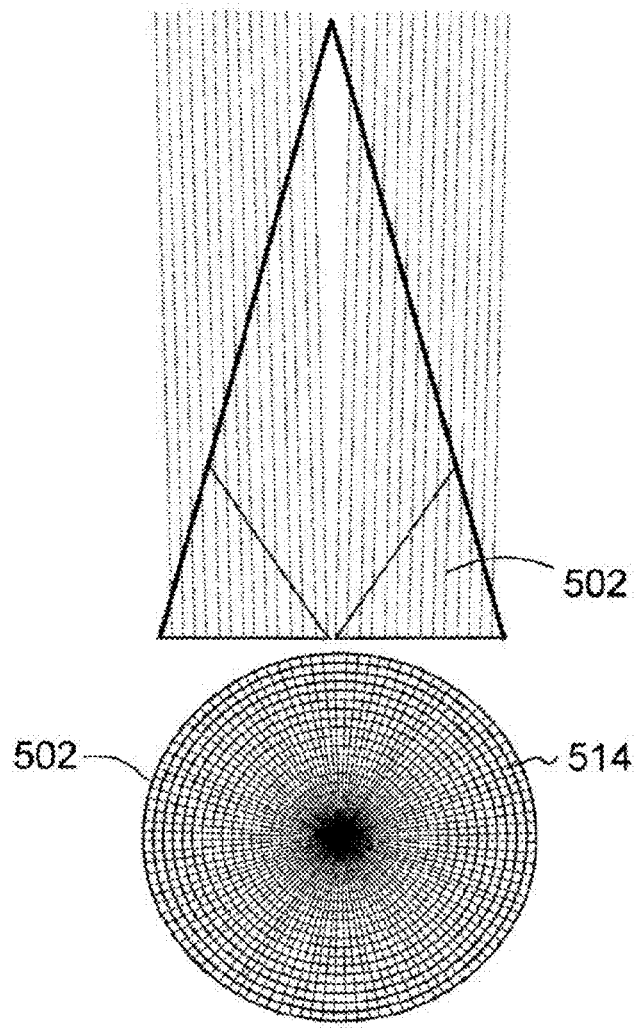
FIG. 6 shows how cells in a grid of a collimator stare at different portions of a conical shell beam of the system as shown in FIG. 5.

The grid structure provides a plurality of cells 514 each of which is arranged to stare at (receive radiation from) a corresponding finite area element of the conical shell beam 112. This is illustrated in FIG. 6, which shows the cell views back-projected onto a cross-section of the primary beam 112. This configuration maintains a nominally constant two-theta per cell. This unfocused arrangement is different from the arrangements of FIGS. 3 and 4 which rely on a focusing collimation.

The grid structure can comprise cells 514 of any shape. In FIGS. 5 and 6, an example embodiment is shown where the lamellae can be understood as comprising a set of radial lamellae and a set of concentric lamellae. This arrangement is desirable because the grid is designed to stare at a conical shell beam, and so each cell 514 will be well matched to a particular given finite area element of the conical shell beam 112.

Figure 7:
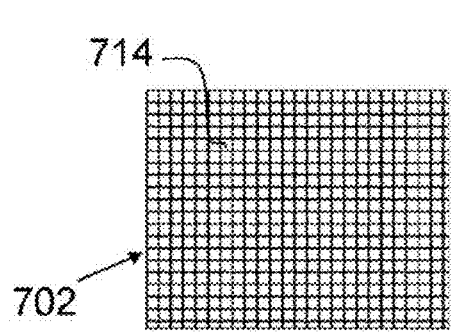
FIG. 7 shows an alternative grid structure for an embodiment of a collimator.

However, it will be appreciated that different forms of grid can be provided. FIG. 7 illustrates a plan view of an alternative embodiment, in which the grid is formed from transverse and longitudinal lamellae forming a grid of cells 714 which have a substantially square cross-section. Each cell/element will have an angular acceptance—if we assume a deeply recessed cell then it will stare at an effectively unique finite area on the primary beam 112. It is to be appreciated that cells could be formed with other shapes such as triangular or hexagonal for example.

For the circular embodiment shown in FIGS. 5 and 6, the lamellae 508 comprise a set of concentric lamellae 510 and a set of radial lamellae 512. The concentric lamellae are provided at different radial positions and are preferably centred around a centre portion 132 of the detection surface 108. The radial lamellae 512 are provided at different angular positions and preferably lie along radial axes originating from a centre portion 132 of the detection surface 108.

Figure 8:
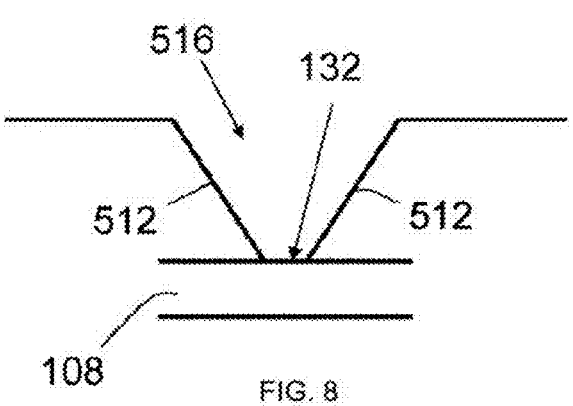
FIG. 8 illustrates a side view cross-section of an aspect of a collimator which is provided in the apparatus of FIG. 5.
Figure 9:
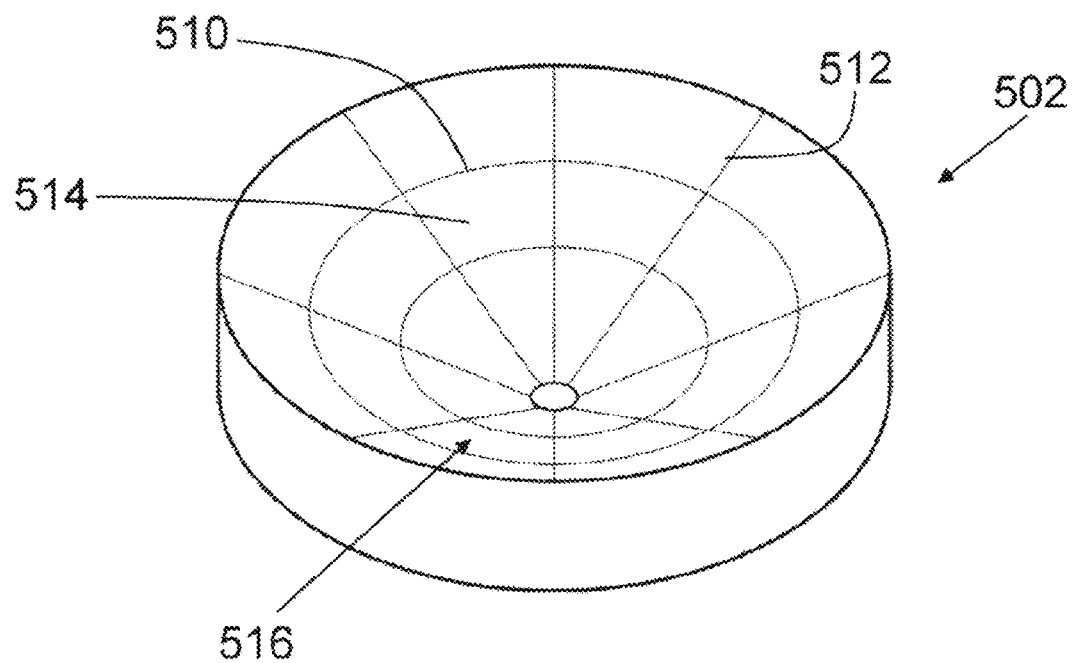
FIG. 9 illustrates a perspective view of the collimator of FIGS. 5, 6 and 8.

The collimator 502 also comprises a cut-out portion 516. As seen in FIGS. 8 and 9, this cut-out portion 516 allows the formation of a focal spot of diffracted flux to form on the detection surface 108 at the centre point 132. FIG. 8 shows a cross-sectional view of the collimator 502. The side walls of the lamellae 512 slope to provide the cut-out portion 516 which at its central point exposes the surface of the detector to a hotspot of radiation. The shape of the cut-out portion 516 is designed to permit the travel of incident beams contributing to a hotspot at the central portion 132.

The structure of FIG. 3, in comparison with a structure of the present disclosure such as that of FIG. 5, can have better signal to noise characteristics due to rejection of incoherent/Compton scatter especially for thick objects that are extended along the range axis. However, the structure of FIG. 3 only interrogates a single range (Z distance).

The structure of the present disclosure such as that of FIG. 5, has improved signal to noise characteristics as compared with the structure of FIG. 4. The lamellae will also provide depth resolution (and thus two theta assuming the wavelength is known) for a significant working range.

Referring back to FIG. 2, a selection of Debye rings are illustrated but in reality there will be a continuous series of Debye rings formed around the annulus 126 of primary X-rays. Therefore, in FIG. 2a, a first outer rim will be formed along a circular path as defined by a series of overlapping points 200 and a second inner rim will be formed along a circular path as defined by a series of overlapping points 202. In FIG. 2b radiation will focus at the hotspot 132, and an outer rim will be formed along a circular path as defined by a series of overlapping points 204. In FIG. 2c, an inner rim will be formed along a circular path as defined by a series of overlapping points 210 and an outer rim will be formed along a circular path as defined by a series of overlapping points 214.

A rim is an envelope formed by a continuum of circles (each circle is a Debye ring) tangent to the rim. Geometrically, an envelope of a family of curves in a plane is a curve that is tangent to each member of the family at some point. In optics a caustic is an envelope of rays. For the purposes of the present disclosure, the terms rim, envelope and caustic can generally be used interchangeably. It is noted again that in practice, the Debye rings will be elliptical rather than circular, having their major axes along radial directions with respect to the conical shell primary beam footprint. However, the principles of the disclosure can be understood in a more concise manner if we make the assumption that the Debye rings are circular.

There are no other caustic curves in the region bounded by outer and inner rims (for a given Debye ring family). However, there are multiplicity of Debye cone intersections together with continuum of different pairs of tangent Debye rings. The hotspot is a special case because it is formed at the intersection of a continuum of Debye rings or equivalently a series of tangential pairs of Debye rings, where the tangent for each pair intersects at the hotspot.

In the illustration of FIG. 2, rings are shown at every radial position and if this was the case then each rim would comprise a continuous line of radiation of (substantially) circular shape. In practice, the angular distribution of radiation will depend on the material e.g. preferred orientation or variable grain size, which is causing the diffraction and so the pattern of the rims can have discontinuities along the path of the rims. These discontinuities can form part of the distinctive signature of a particular material and so detection of the patterns of radiation along a rim can be useful for material identification.

This central region is in effect self-collimating. Outside of this, the lamellae 510, 512 inhibit the collection of diffracted rays which do not lie along the rims. This reduces parasitic background and so improves the signal to noise ratio of the collected signal. In practice the reduction of parasitic signals from different rims formed by many different families (each with a constant two-theta value) of Debye cones will improve the signal to noise ratio.

It is possible to provide a collimator 502 that employs only radial lamellae 512, without any concentric lamellae 510. However, in that case the range to the sample needs to be known in order to calculate the two-theta (and hence material d-spacing) angle.

If radial lamellae 512 are combined with concentric circular lamellae 510 then each cell 514 will collect diffracted flux from a corresponding region of the primary beam 112 and will enable the calculation of two-theta without knowledge of the position of the sample 110 along the interrogating beam.

The presence of both radial lamellae 512 and concentric lamellae 510 defining a grid structure comprising cells 514 means that the signal to noise ratio of the signal collected at each cell 514 is improved.

FIG. 9 shows a perspective view of a collimator structure 502, showing an example of how the radial lamellae 512, concentric lamellae 510 and cut-out portion 516 can be formed.

There can be any number of each type of lamellae, according to the desired grid resolution, say from eight or less up to several hundred or more.

The angles of the lamellae can be chosen to collect radiation appropriately, so that each cell 514 in the grid will stare at (receive radiation originating from) a corresponding finite area element of the conical shell beam 112.

The collimator 502 can be manufactured by any suitable means. The fabrication process can include steps of bonding, shearing, angling, cutting and milling, to form lamellae which comprise constant thickness materials that are free from defects.

Figure 10:
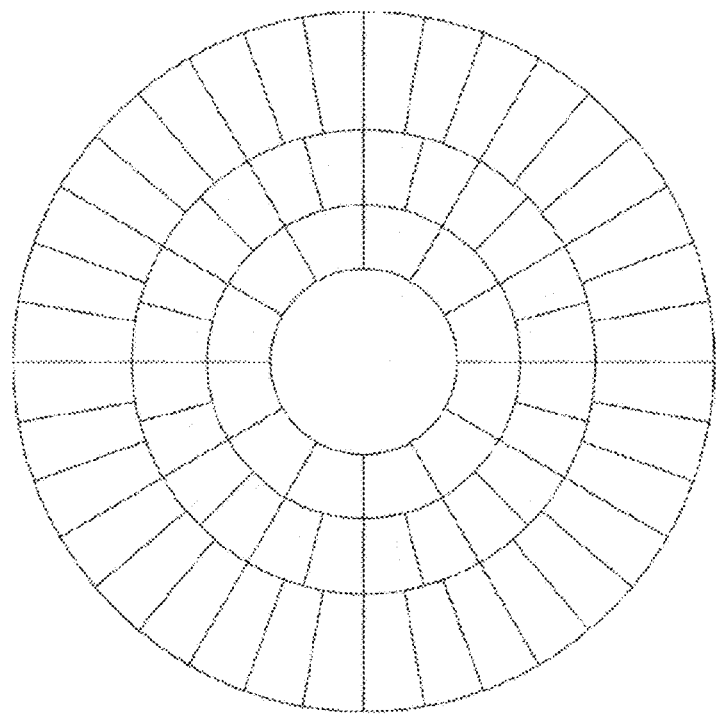
FIG. 10 illustrates an alternative collimator which can be used with the apparatus of FIGS. 5, 6 and 8.

FIG. 10 shows a plan view of a collimator 800 according to an alternative embodiment, in which the radial lamellae 802 have varying pitches according to their radial position. This is advantageous because when full length lamellae are employed then the finite thickness of the lamellae occlude a relatively large detector area for relatively small radii. Also, the finite thickness limits physically the circumferential separation, so this can be improved with an arrangement like this.

The occluder 520 can be in the form of a cone shape and extends from a position close to or in contact with an exit side of the sample 110 to a point which is close to the detection surface 108. By spanning this space, the occluder 520 attenuates crossover diffracted flux to enable the unambiguous calculation of two-theta angles when the location of the object 110 under inspection is as shown in FIG. 5.

A detector 522 is provided at the detection surface 108 to collect the diffracted flux. It is possible to use various types of detectors. A preferred embodiment would be a detector with a large sensing area that can detect radiation incident at each cell 514. The detector can be energy resolving if broadband incident radiation is provided.

The detector 522 can be coupled with an appropriate system 524 that comprises memory and software that stores and analyses data that is collected by the detector 522. The system 524 can comprise a computer which executes instructions for carrying out processing of the data. The instructions can be downloaded or installed from computer-readable medium which is provided for implementing data analysis according to the disclosure.

Material identification can be communicated to a user by a suitable display or other type of indicia such as an audible of visible alarm signal. When a computer having a display is used, graphical and audio alerts can be generated when one or more particular substances are identified; and more complex data can be displayed in text or graphical format as appropriate.

Figure 11:
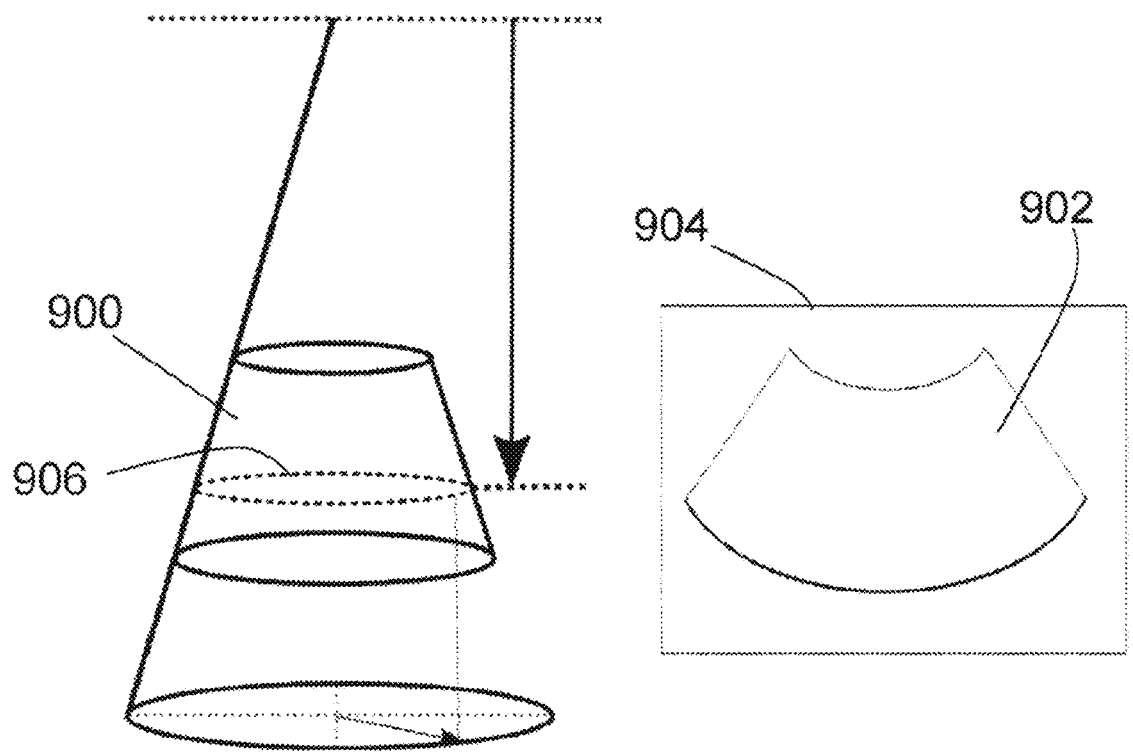
FIGS. 11 and 12 show aspects of how an image of an object can be obtained.
Figure 12:
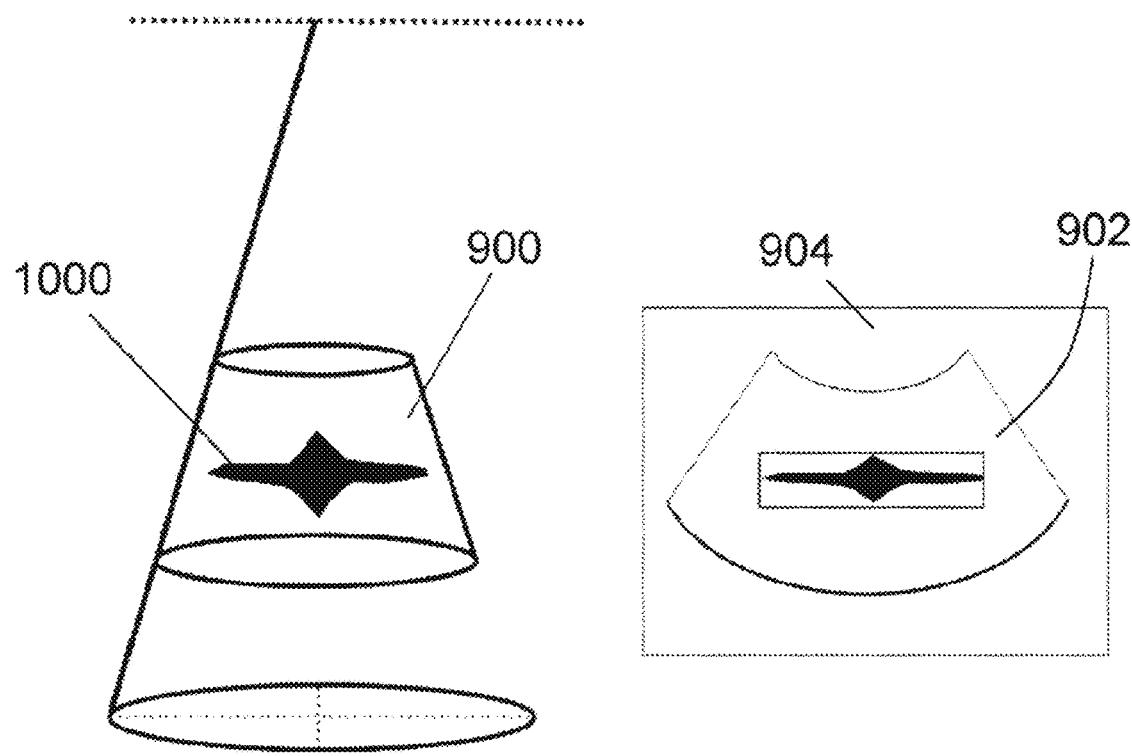

An image of an object under inspection can also be generated. An example of the principles of this can be seen in FIGS. 11 and 12. When a beam is incident upon a flat sample of finite thickness, which is positioned normally with respect to the symmetry axis the specimen or gauge volume is a frustum 900 of the conical shell 112. Each finite area element composing the frustum corresponds to a unique cell and can be identified via three variables, for example by a set of polar coordinates combined with a range. The gauge volume can be visualised via graphical reconstruction in a display; rotated and moved or unfurled (net of a frustum). FIG. 11 shows an unfurled visualisation 902 in a display window 904 of an electronic or digital display which can receive input from a computer system 524. It will be appreciated that the visualisation can be mapped into other shapes such as a rectangular or circular area. FIG. 12 shows an example of how an object 1000 can be visualised on the display 904.

The apparatus 500 of FIG. 5 has utility as a material specific probe. It can be termed as a "point and shoot" detection system. FIG. 5 shows a stationary object but the object could be moving and the detection system could analyse a swept gauge volume. One example application area would be to have objects travelling on a conveyor belt and the system 500 could be used for the detection of specified materials, such as drugs or other contraband, in objects as they pass along the conveyor belt. This could be done either longitudinally or transversely with respect to the conveyor belt. That is, the X-ray source could stare down at the belt and the detector could be below it; or the X-ray source could stare across the conveyor belt from one side and the detector could be provided across the conveyor belt at the other side.

It is also possible for a beam to track an object during a scan. For example, the source and beam could rotate relative to each other to sweep the beam along a linear movement direction to keep staring at an object. This can be achieved by incorporation of image segmentation and object tracking software provided at the computer system 524; and a pre-screening system can also be provided to provided coordinates.

A pre-screener could be a; single view, multiple view or computed tomography (CT) X-ray system (or any other orthogonal screening technology) that employs spectroscopic/absorption analysis e.g. dual/multi-energy analysis to provide say average atomic number and physical density estimates within a spatial 2D/3D image. A suspect area/volume (potential signature for contraband; drugs/explosive, homemade explosives (HME), currency etc) can be assigned a relative coordinate position (x,y) or (x,y,z). The relative coordinate position determined by the pre-screening system can then be input to the diffraction probe. The probe could then be rotated and or translated to interrogate the region of interest. This operation could be a static point and shoot mode or involve relative scan movement to acquire an integrated signal from different relative station points along an axis through the threat area/volume. This combined or integrated method will help provide False Alarm resolution/enhanced specificity and sensitivity to reduce the probability of false alarm and increase the probability of detection, respectively.

In an alternative embodiment, the object 110 and the detector could be translated relative to each other (by moving one or both of the object 100 and the detector) to scan a larger area. As an example, a raster scan can be employed. As the scan progresses, successive data frames can be stored and analysed by the system 524. Also, a multi-emitter X-ray source could also provide the required coverage.

The device of the present disclosure can be used as a depth resolving material specific probe. Signals can be circumferentially integrated to obtain enhanced particle statistics; see dotted line 906 in FIG. 11. The approach includes consideration of any other axial direction or even the full gauge volume or portions thereof.

As well as material identification, the data from the system of the present disclosure can also be combined with absorption data to obtain images of objects which can be presented to a human observer; for example as discussed in WO 2011/158047.

Various modifications of the apparatus of FIG. 5 are possible. For example, a detector surface could be positioned between the radiation source and sample and be arranged to collect back-scattered radiation. One example of such a device can be understood with reference to FIG. 13, which shows a primary beam 1112 emitted from a source 1102 passing through a detector 1108 before being incident on a sample 1110. The sample 1110 reflects scattered radiation back towards the detector 1108 and a collimator 1114 acts similarly to the collimator 502 of the previous FIG.s to provide both angular and radial resolution by virtue of a grid structure of cells 1120 formed by radial lamellae 1124 and concentric lamellae 1126. As with the embodiments described above, the shape of the collimator 1114 allows the formation of a hotspot at the central location 1132.

A device which collects back-scattered radiation can be useful for the conveyor belt example mentioned above.

It is also possible to provide at least two different detectors, arranged to detect both forward-transmitted diffracted radiation (as shown in FIG. 5) and back-scattered diffracted radiation.

According to another aspect of the disclosure, a sample inspection apparatus comprises a source of electromagnetic radiation, a beam former for producing a substantially conical shell of radiation, a first radiation detector arranged to receive diffracted radiation after incidence of the conical shell beam upon a sample to be inspected. The detection surface is provided with a coded aperture at a point where a radiation "hotspot" is expected to form. This can be at a position along a symmetry axis of the apparatus. The apparatus also comprises a range detector which is arranged to collect radiation transmitted through the coded aperture.

The image from the coded aperture together with a known source and detector configuration enables a range and a two-theta angle for a sample to be calculated. Once this has been done it informs and supports the analysis of the diffracted flux that is collected by the first radiation detector. That is, diffracted flux from the same Debye ring family as that forming a hotspot, can be identified via radial distribution and wavelength.

The coded aperture can in one embodiment comprise a single aperture and therefore be a pinhole camera.

The first radiation detector referred to here is similar to that discussed above. It is used to detect patterns of relatively high intensity radiation ("rims") formed by overlapping Debye rings and to determine information that can identify the presence of a given material by matching the detected patterns with known material signatures.

Apparatus such as that shown in FIG. 5 can be used to detect the presence of a given material in cases where the object range is known or restricted. This is useful in many scenarios where the position of a sample to be scanned can be well controlled. However, diffracted flux which is incident at the hotspot is not encoded with range information and therefore the hotspot has only implicit material identification information. Flux detected at the hotspot requires to be matched or correlated via radial distribution and energy or wavelength to a depth decoded rim via surrounding collimator cells.

Figure 14:
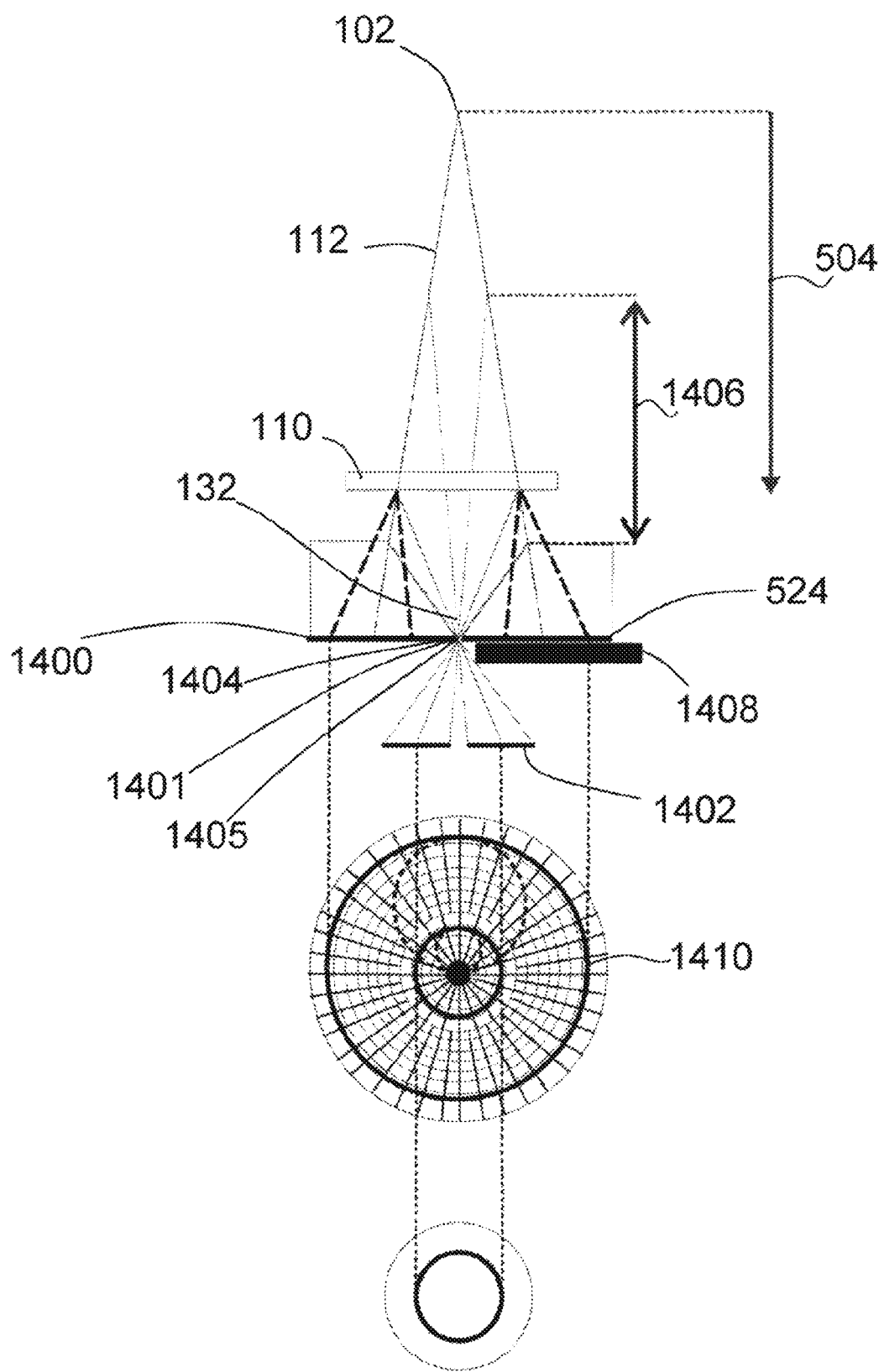
FIG. 14 illustrates a side view cross-section of a sample inspection apparatus according to an embodiment of the disclosure, which provides two detection functions.

A sample inspection apparatus according to this aspect as shown for example in FIG. 14 provides an additional range detection function for the "hotspot" radiation and therefore enables sample analysis even when the object range is not well controlled, and thus can be used in an even wider range of applications. This is because the hotspot alone can be used to establish material phase identification. As an example, the apparatus of FIG. 14 will cope better than the apparatus of FIG. 5 in a security screening application such as scanning carry-on and hold luggage, which is an example of an application where the object range is not well controlled.

FIG. 14 illustrates an embodiment of a sample inspection apparatus according to an embodiment of the disclosure, which provides a first radiation detector and a range detector. In FIG. 14, various components are shared with those of FIG. 5 and so like components are illustrated with like reference numerals.

The arrangement of FIG. 14 by including a range detector provides explicit material identification, without requiring there to be a rim, that is, the rim can fall outside the detection region of the detector or could be occluded by clutter surrounding the sample. The rim material identification information is similar to the hotspot material identification information, but the beam paths that form the hotspot and the rim are different. In practice (say for cluttered scenes) beam paths can be disrupted or occluded partially or fully by other objects or samples. It is useful to have different beam paths available for analysis in application areas such as security screening.

Any flux which is not propagating through a point (perspective centre) will increase point-spread-function. The disclosure of this aspect enables a smaller aperture, coupled with an extended angular acceptance range to provide enhanced determination of two-theta by virtue of improved image fidelity.

Here, a first detector 1400 together with a shield 1408 provide a coded aperture mask 1401. The first detector 1400 is a primary radiation detector that functions in a manner similar to that described above for FIGS. 5 through 13. The coded aperture mask 1401 is arranged to allow radiation to pass to a second detector 1402 which performs a range detection function. This is achieved by the provision of an aperture 1404 at the surface of the detector 1400 and a spacing 1405 at the shield 1408.

In this embodiment, the aperture 1404 is provided as the coded aperture and the spacing 1405 is a wider passage that does not form an imaging function as the purpose of the shield 1408 is to ensure attenuation of the primary beam 112 and any radiation scatter from the detector itself, so it can have a different shape such as an annular shape to provide this function. It is to be appreciated that the shield 1408 does not have to be provided as a separate component. In an alternative embodiment, the detector 1400 is an integral part of the coded aperture mask 1401; that is a detection surface can be formed on the surface of a coded aperture mask, or a detector can have sufficient thickness to attenuate incident radiation and be provided with an aperture so that is also acts as a coded aperture.

This embodiment shows a single aperture 1404, which is a fundamental implementation of a coded aperture known as a pinhole aperture. It is to be appreciated that an "aperture" in this context means a portion of the detector 1400 that provides a different attenuation of incident radiation as compared with the remaining substantial portion of the detector surface. Although in preferred embodiments the aperture can be void of solid material, in alternative embodiments the aperture can comprise solid material that lets incident radiation of the relevant energy pass through it.

The aperture 1404 is provided at the centre point 132 of the detection surface 1400 and so effectively forms a lens which produces an image on the surface of the second detector 1402. The known geometric configuration of the aperture 1404 and the conical shell beam 112 enables the depth or range of a source of diffracted flux to be computed. In the example illustrated, the range of the sample 110 (or a component part of it) to the detector surface 1400 will be determined by the diameter of the ring 1410 of relatively intense radiation formed on the detection surface of the second detector 1402. The relevant calculations for determining material characteristics from the detected radiation can be carried out by the system 524.

The second detector 1402 can comprise an annular detection surface, or can comprise an area sensor of any other suitable shape; or any other suitable detector. For example, one suitable camera can provide a pixelated (80×80 and 2 cm square) CZT energy resolving detector e.g. energy resolution 800 eV average at 60 k eV, with a total energy range 4-200 keV, with a maximum count rate of 10 million photons per second.

The ability to obtain depth information means that the effective working range 1406 of the system can be increased as compared with the effective working range of an apparatus that does not have a range detection function, compare for example the working range 506 of the apparatus of FIG. 5 with the larger working range 1406 of the apparatus of FIG. 14.

The embodiment of FIG. 14 shows the use of a collimator 502, and the apparatus of FIG. 14 can generally be provided with any appropriate form of collimation including all the features described above with reference to FIGS. 5 to 8. However, it is to be appreciated that the provision of collimation is optional. Omitting the collimator 502 achieves a lower bill of materials, lower weight of device, and lower complexity of manufacture.

In alternative embodiments, other coded apertures can be provided which are more complex as compared to a pinhole aperture as illustrated in FIG. 14. These more complex apertures comprise patterns of material which are transparent to incident radiation. The modulation produced by the specific pattern can be used to reconstruct a sharp image from a combination of images produced by each portion of the pattern. This combination is achieved by a computational algorithm which can be executed by the system 524. The use of coded apertures would be useful to maximise the amount of information that can be collected in conditions of low illumination levels. An improved signal to noise ratio can be achieved.

Figure 13:
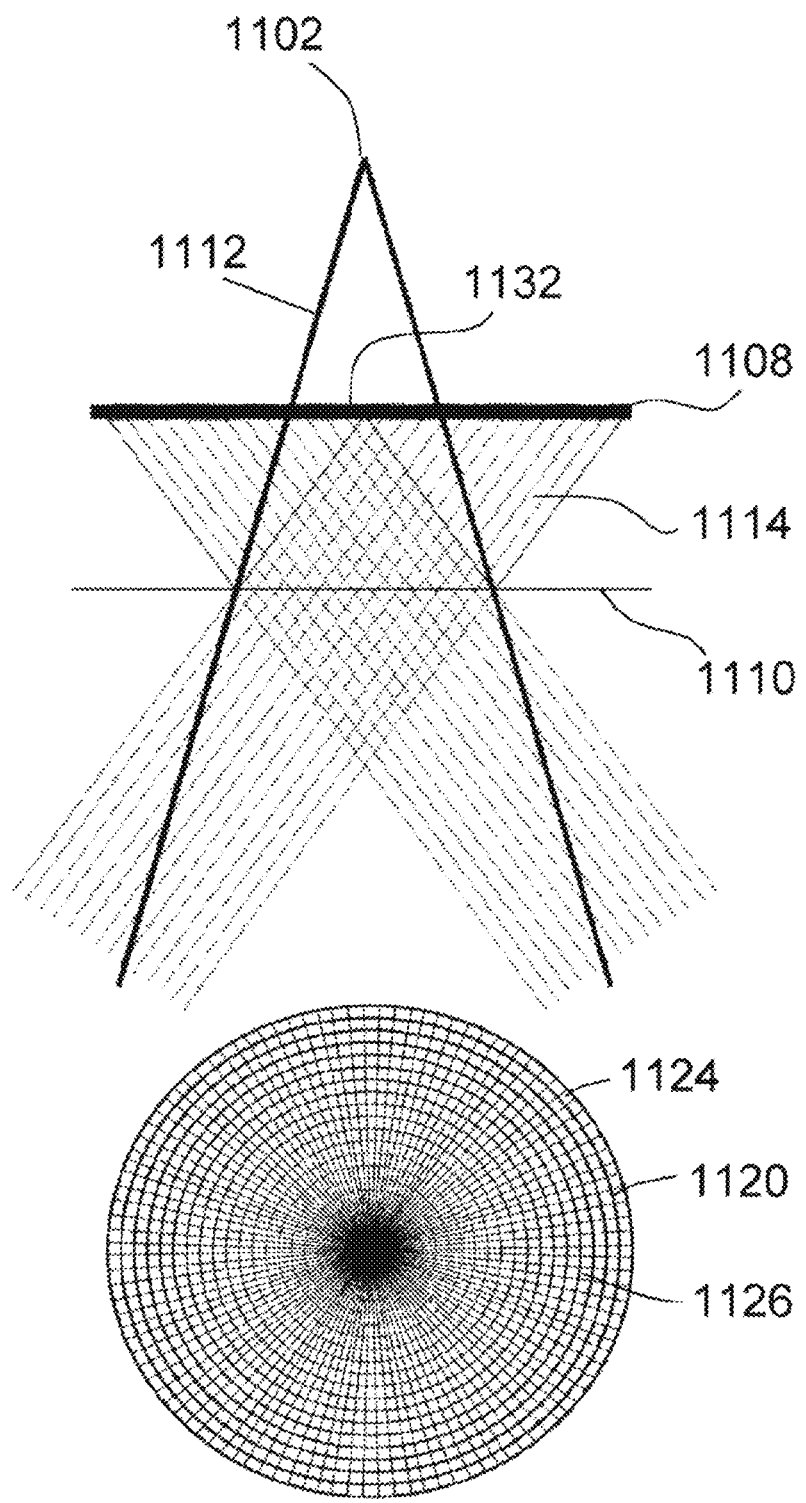
FIG. 13 shows an embodiment of an apparatus for collecting back-scattered diffracted radiation.

Various modifications of the apparatus of FIG. 14 are possible. For example, the first and second detectors 1400, 1402 can be positioned between the radiation source and sample and be arranged to collect back-scattered radiation. It is also possible to provide at least two different sets of first detectors and/or second detectors, arranged to detect both transmission mode (as shown in FIG. 14) and back-scattered diffraction signals. Similar principles as illustrated in FIG. 13 would apply.

When designing an aperture for a coded aperture mask for use with X-ray or similar high energy radiation, it is important to ensure that the aperture has the appropriate shape but also that the surrounding mask is thick enough to attenuate or block incident radiation.

Figure 15:
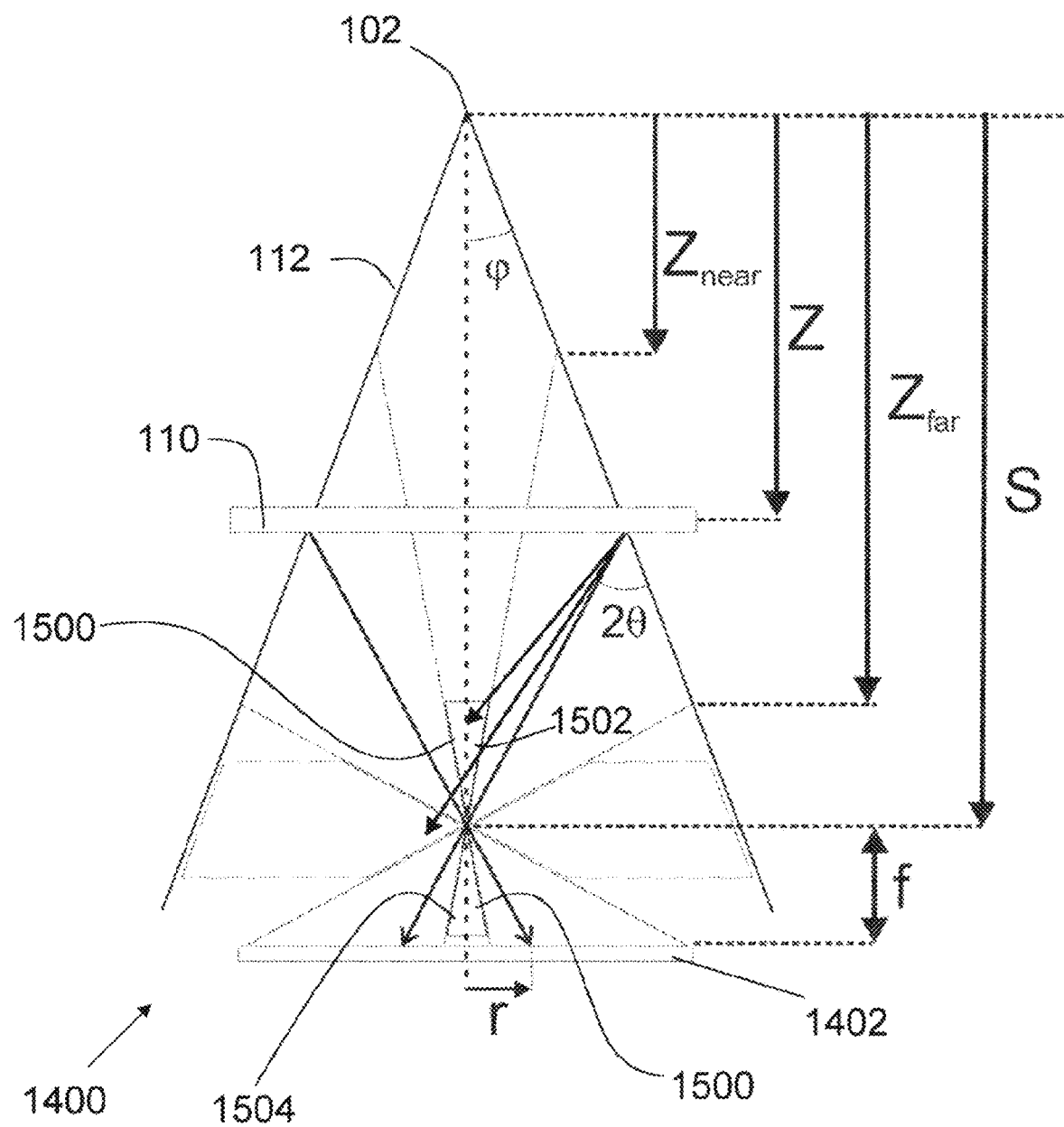
FIG. 15 illustrates side view cross-section of a first detector which can be used with the sample inspection apparatus of FIG. 14.

FIG. 15 shows an embodiment of a coded aperture mask 1400. Here, the body of the detector 1400 is provided with angled sidewalls that taper towards a centre point. This corresponds to the centre point 132 where a hotspot can be formed as described above.

FIG. 15 also shows an additional optional occluder 1500, which can be provided also with the apparatus of FIG. 14 and other embodiments. The central occluder 1500 acts to improve the signal to noise ratio by attenuating rays of radiation which are not part of the main beam of interest, which is focused at the centre point 132. In this embodiment the central occluder 1500 has an upper portion 1502 and a lower portion 1504 which each taper to a centre point, though other arrangements are possible. There could be a gap at the centre point, or the occluder 1500 can comprise rigidly connected or touching apexes which can provide improved rigidity but would absorb the incident flux to some extent. The occluder 1500 can be held by a supporting web of struts (either hollow or solid) configured to overlap lamellae. The struts can be fabricated from a material that exhibits low X-ray absorption and low X-ray scattering, and is preferably low density. A suitable choice can be a laminate plastic such as Tufnol.

According to a further aspect of the present disclosure, there is provided a sample inspection apparatus which produces a conical shell of radiation and which has a radiation detection system providing a multi-planar detection surface. In a preferred embodiment, a radiation detection system comprises a plurality of detectors providing detection surfaces which are inclined with respect to each other. The detectors can also be in a tiled arrangement. More preferably, each of the detectors in the radiation detection system is arranged to stare at (collect radiation from) a given direction or portion of diffracted radiation that is scattered from a sample under inspection.

The staring angles of the detectors can be configured to accommodate any supporting processing electronics and or cooling arrangements that would otherwise stop the detectors being arranged such that their detection surfaces tessellate a plane. The inclined detector surfaces result in semi elliptical caustics, which enable an increased two-theta coverage and increased d-spacing reach. In addition, specific points on the detection surface can be oriented to collect diffracted flux from a sample at normal incidence. The normal incident flux will exhibit a reduction in spatial smearing and therefore a reduction in peak broadening and improved peak discriminability.

Using existing radiation detectors, a radiation detection system according to this aspect will comprise a plurality of detectors which provide planar detection surfaces and are inclined with respect to each other. However, it will be appreciated that the disclosure can also provide for curved detection surfaces which can be possible with future advances in flexible electronics. In this case, using curved surface detectors, the detection system can comprise a plurality of curved sensors or a single curved detection surface.

In a preferred embodiment, the arrangement of the detectors or detector of the radiation detection system provides an aperture between neighbouring detectors. The aperture can correspond to a centre point 132 where a hotspot can be expected to form, as discussed above. The detectors can be provided in a tiled arrangement so that a gap between neighbouring detectors is provided and forms the aperture. A further detector can be provided for detecting radiation passing through said aperture.

The radiation detection system can also be provided with a collimator which in a preferred embodiment could be a collimator as described above with reference to FIGS. 5 to 8, that is, a collimator which comprises an unfocused collimator provided at or close to a detection surface of the detectors and having a grid structure formed of cells which each stare at different portions of the conical shell formed by the primary beam.

The apparatus according to this aspect can further comprise either a point detector provided at the aperture or a range detector spaced from the aperture and provided to detect a focused image.

Various embodiments of this aspect are illustrated with respect to FIGS. 16 to 19. These figures illustrate an embodiment where four detectors are tiled and inclined with respect to each other although it will be appreciated that other numbers of detectors and other shapes of detectors can be used in accordance with this aspect.

Figure 16:
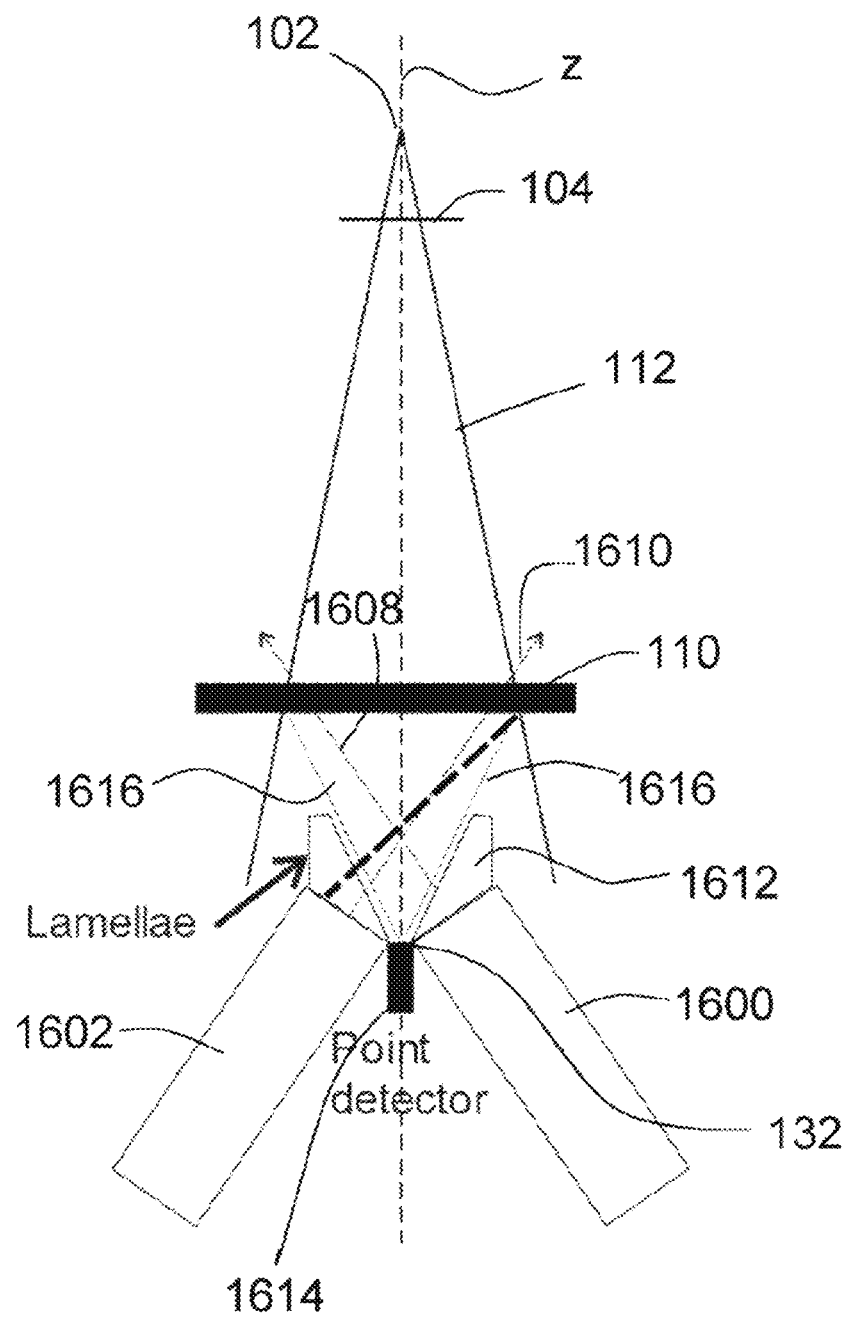
FIG. 16 illustrates an embodiment of a sample inspection apparatus with a set of inclined detectors.

Turning to FIG. 16, as before, point source 102 passes through a beam former 104 emitting a primary beam of radiation 112 which impacts upon a sample 110. A detection system is provided which, in this embodiment (and as shown also in FIG. 18), comprises four tiled detectors 1600, 1602, 1604, 1606. These detectors are inclined with respect to each other to stare in different directions illustrated by detector 1600 staring in direction 1608 in FIG. 16, and detector 1602 staring in direction 1610 as illustrated in FIG. 16. In the embodiment of FIG. 16, the system is further provided with a collimator 1612. The collimator 1612 can formed as single piece or can be provided by separate pieces at each of the point detectors 1600 through 1606. The collimator 1612 can be similar in its function to the collimator described above 502 with respect to FIG. 5 and following.

In addition, an apparatus according to the embodiment of FIG. 16 provides point detector 1614 which is arranged to receive diffracted radiation 1616 which is focused at a hotspot. The point detector 1614 is provided at a central portion 132 where a hotspot can be expected to form, that is, it lies along a symmetry axis of the system illustrated by z in the FIG. The system of FIG. 16 acts in a similar way to that described above with respect to FIGS. 5 through 13, except for the inclination of the detectors 1600-1606 which provides advantages as explained above.

Figure 17:
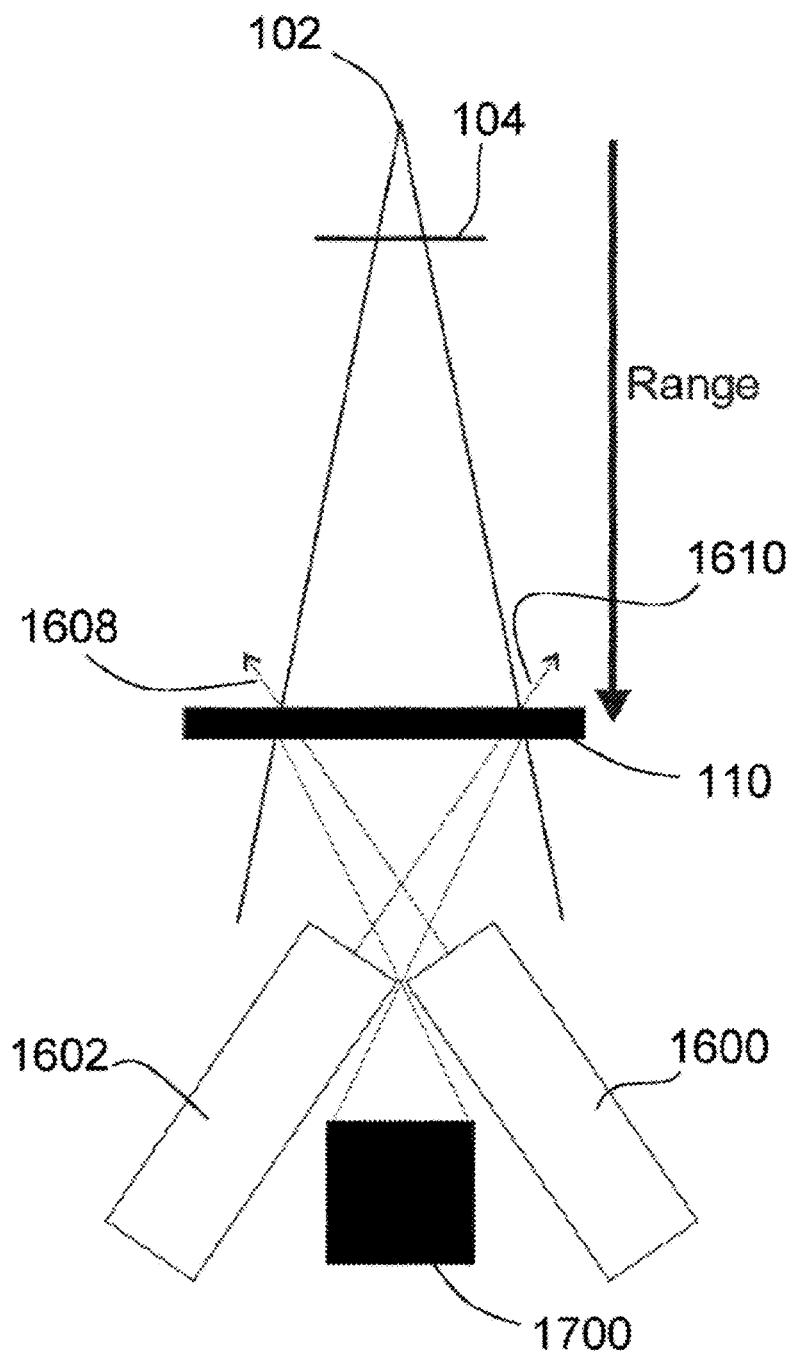
FIG. 17 illustrates an alternative embodiment of a sample inspection apparatus with a set of inclined detectors.

FIG. 17 illustrates an alternative embodiment which acts in a similar way to the aspect described above with reference to FIGS. 14 and 15. Here, a range detector 1700 is provided that detects self-collimated radiation passing through the coded aperture provided by the gap between the detectors 1600 through 1606. As described above, the two-theta detection function is provided by the detectors 1600-1606 and the range detection function is provided by the detector 1700 for improved intelligence with material identification and imaging.

The embodiments of FIGS. 16 and 17 can also comprise a system 524 similar to that described above, which comprises memory and software that stores and analyses data that is collected by the detector 522.

Figure 18:
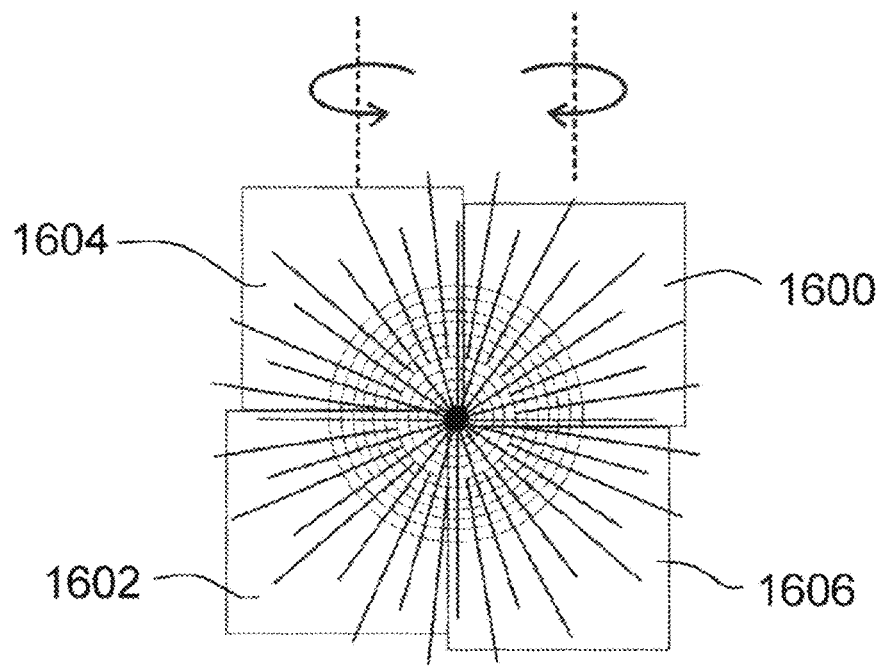
FIG. 18 illustrates an arrangement of detectors that can be used with either of the embodiments shown in FIG. 16 or 17.

FIG. 18 illustrates a plan view of a tiled detector arrangement that can be used with the embodiments shown in FIG. 16 or FIG. 17. As shown here, four detectors are tiled together forming an aperture at a centre point. In addition, an embodiment of the lamellae formed by the collimator are illustrated by the grids marked on the detector surfaces. As before, these lamellae comprise a cut-out portion that allows the collection of radiation at a hotspot.

Figure 19:
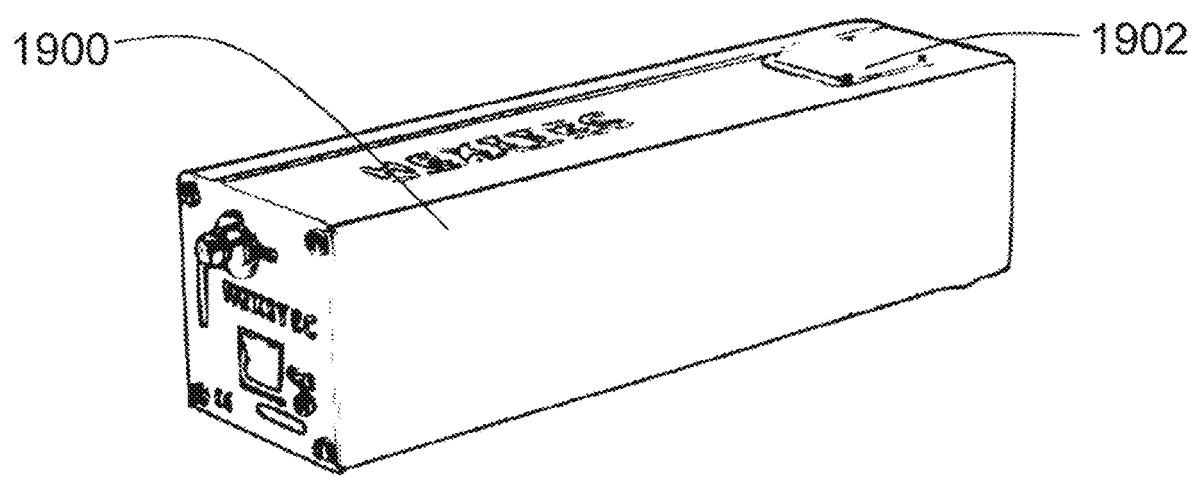
FIG. 19 illustrates a detector that can be used in various embodiments of the disclosure.

FIG. 19 illustrates an example of the type of detector which can be used as one of the detectors 1600 through 1606. This detector 1900 has an imager 1902 mounted on one of its long sides, providing a detection surface parallel to the plane of that side. A plurality of these detectors 1900 can be provided in an arrangement where respective detection surfaces 1902 are inclined with respect to each other and can be tiled together to provide an aperture. The detector tiling can have a gap or gaps and or inclinations to accommodate an intermediary coded aperture. It is to be appreciated that this detector 1900 is shown as an illustrative example only.

The aperture provided between tiled detectors according to this aspect of the disclosure can be provided by simply placing the detectors carefully together in a given arrangement to form a small gap between their respective edges. Alternatively, the existing housings of one or more of the detectors can be profiled or cut out in order to form an aperture.

In alternative embodiments, a separate bracket could be provided where the bracket is arranged to hold the detectors in position and is shaped to provide an aperture. The shape of the aperture of such a bracket can resemble the shape of the aperture shown in FIG. 15, for example. It can also be provided with an occluder for blocking out stray radiation, again in a manner similar to that shown in FIG. 15.

According to a further aspect of the disclosure, there is provided an apparatus for detection of scattered radiation which comprises a multi-conical shell beam system. This enables analysis of a plurality of diffraction (two-theta) angles for material analysis.

Figure 20:
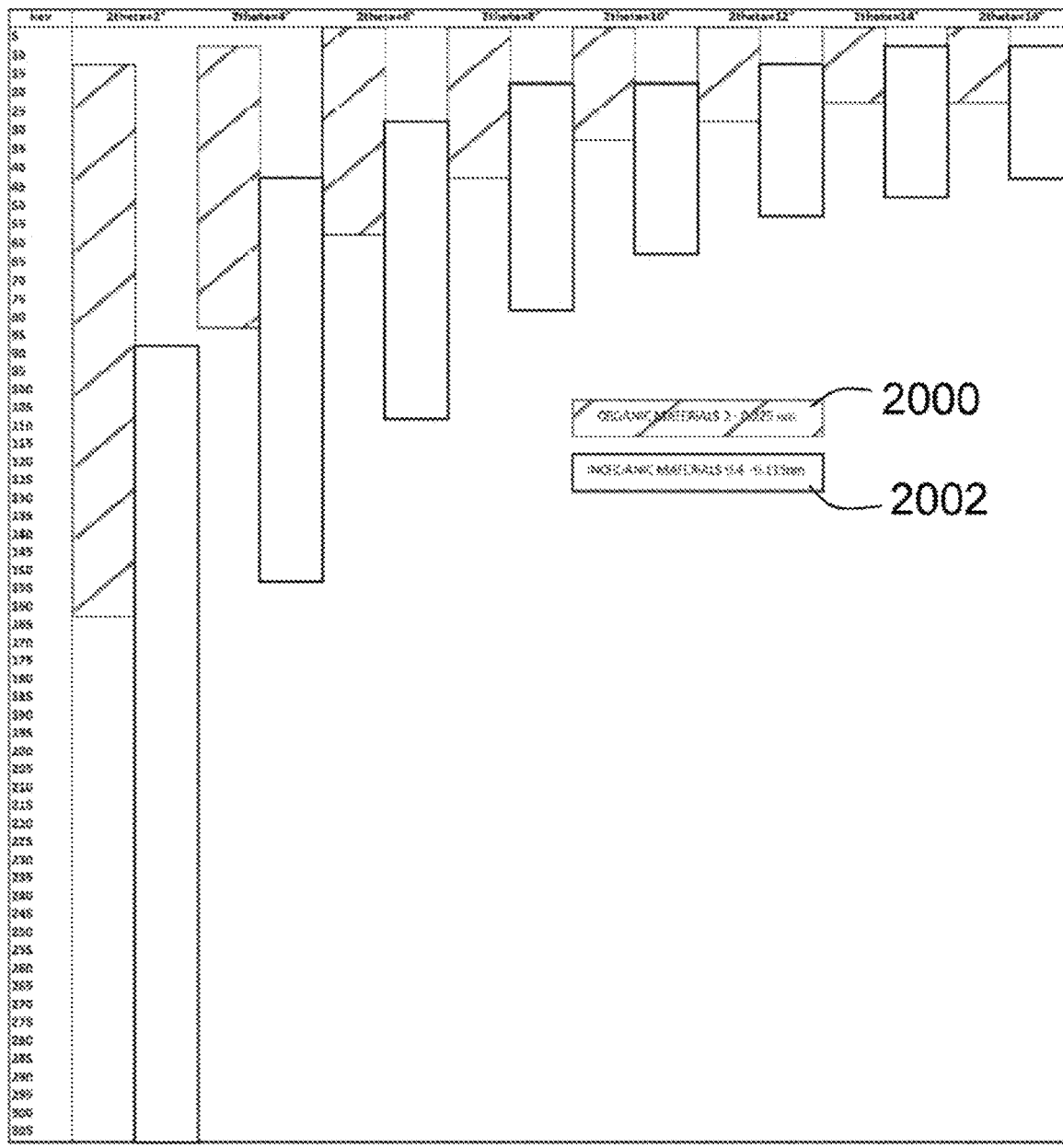
FIG. 20 is a table that illustrates d-spacing for organic and inorganic materials in terms of energy and scatter angle.

FIG. 20 illustrates a table of d-spacing for organic and inorganic materials in terms of energy and scatter angle. According to the key, materials 2000 are organic, assumed to have d-spacings of between 2 and 0.225 nm, and materials 2002 are inorganic, assumed to have d-spacings of between 0.4 and 0.115 nm. The energy in keV is plotted vertically and the bars show successive two-theta angles for each type of material, from two degree to 16 degrees.

The table is populated according to the following equation:

$$E = \frac{6.2}{d \sin \theta} keV$$

This equation is derived by combining Bragg's condition with the Planck-Einstein relationship.

It can be appreciated from the FIG. 20 that for a relatively large range of d-spacings to be calculated via a single diffraction reading or scan then a degree of compromise is required. For example, in a security screening scenario the explosive substances TNT and HMX have many similar diffraction intensity peaks across the d-spacing range 0.8 to 0.2 nm thus a multiple two-theta angle arrangement would be an advantage. In contrast, PETN and sodium stearate have a single dominant diffraction maxima at 0.38 and 0.4 nm respectively and detection from a single, fixed angle arrangement would be more appropriate.

In the case of drug targets, a similar analysis can be performed e.g. cocaine hydrochloride produces diffraction maxima over an extended energy (d-spacing) range whereas amphetamine sulphates can be identified from a single peak at approximately 1.5 nm.

Other considerations include the variable thickness of potential threat materials/samples and or the presence of cluttering objects, which are encountered routinely in security screening applications e.g. baggage or mobile electronic device screening. Thus, relatively smaller two-theta angles and higher energy interrogating photons can be employed to overcome the effects of sample absorption and or absorbing clutter to provide rapid detection and identification. In such applications the inevitable effect of some geometrical broadening (cot(theta) effect) associated with higher energy diffraction peaks can be a secondary consideration, especially in low exposure "real-time" screening tasks. Thus in practice some lower fidelity signal is preferable to an insufficient amount of a "potentially" higher fidelity signal.

According to this aspect of the disclosure, the apparatus is provided with a beam former for producing a set of concentric, conical shells of radiation from an X-ray source. For example, the beam former can employ focused circular or conical shell slits formed in an otherwise beam blocking material. Alternatively, X-rays from an isotropic source can redirected by an optical element or device to form conical bands of X-rays. In addition, each conical shell of X-rays can originate from a different position along the symmetry axis (z-axis) of the system. This can be understood with reference to FIG. 22, which shows primary beams generated by an extended X-ray source along the vertical (z-axis) direction or by stacked discrete x-ray sources. Each source has a corresponding beam shaper and can support a constant opening beam angle (a) or different beam angles (b). The primary beams of FIG. 22 could replace the primary beams of FIG. 21, with other components of FIG. 21 being similar.

The conical shell beams can be incident upon a sample in an inspection volume and diffracted radiation is collected by a set of conical shell slot collimators which each stare at different annular regions on a conical shell of primary rays.

This resultant configuration can be considered as a series of concentric but independent diffraction systems, that is, each conical shell and its corresponding collimator form a discrete system as there is nominally no diffracted flux coupling between each system. A maximum working range depends on the angular separation of each concentric conical shell together with the staring angle (two theta) of each conical shell slot collimator. The values of these parameters should be chosen so that if a sample is presented within an inspection volume within the resulting working range then each conical shell slot collimator will stare at just one conical shell.

Figure 21:
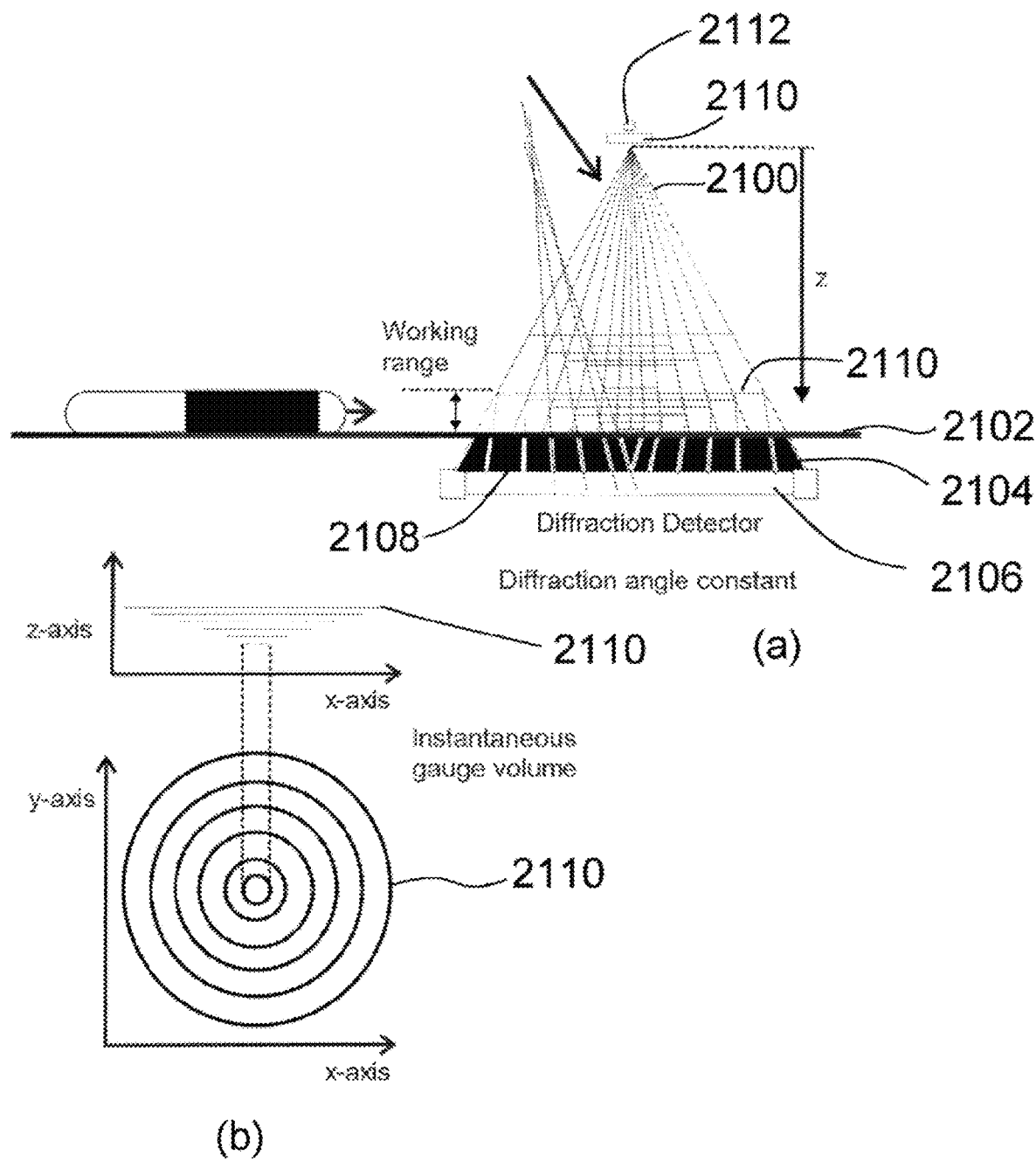
FIG. 21 illustrates an embodiment of an apparatus according to the disclosure which comprises a multi-conical shell beam system.

An example of such an arrangement is shown in FIG. 21. Here, a beam former 2110 modifies radiation from a radiation source 2112 to produce a plurality of conical shell beams 2100. These shell beams are incident upon a work surface 2102 and are incident upon an occluder 2104 which allows corresponding diffracted flux from a sample can be incident upon a diffraction detector 2106. The occluder 2104 has a body formed from a material suitable for blocking incident radiation, such as tungsten which can be suitable for blocking x-ray radiation, and has formed within it a plurality of channels 2108 for allowing diffracted radiation to pass through to the diffraction detector 2106. The working surface 2102 is transparent to the diffracted radiation. Each of the conical shell slot collimators stare at different annular regions on different conical shells of primary radiation. This is illustrated at reference numeral 2110 and understood with reference to both parts (a) and (b) of FIG. 21.

Each conical shell slot collimator (CSSC) stares at an annular region on a conical shell of primary x-rays. An annular (or partially annular) specimen path is formed when a sample occupies this region. The diffracted photons from the sample travel along a known trajectory specified by the collimator two-theta angles. This information in combination with the energy/wavelength (Planck-Einstein relation) quantification via an energy resolving detector enables d-spacings for a sample to be calculated from Bragg's condition.

As mentioned above, each collimator should receive diffracted photons only from the correct or corresponding incident beam to enable the unequivocal calculation of d-spacings and other structural parameters, for example preferred orientation and grain size. If this condition is not satisfied then two or more different two-theta angles can be associated with the photons received by a collimator, which will reduce both the sensitivity and specificity and potentially destroy the analytical capability of the technique.

To ensure that diffracted flux from a sample can be received only at a known two-theta angle then the following design criteria and analysis has to be adopted.

Figure 22:
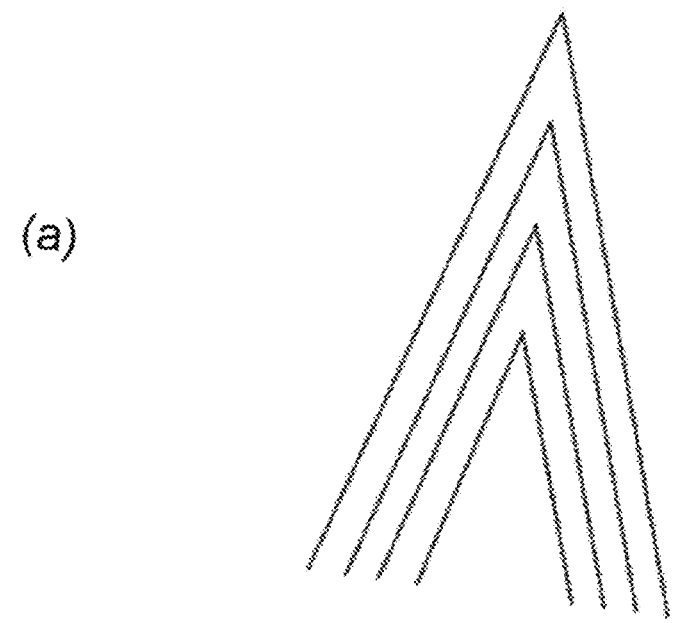
FIG. 22 shows primary beams generated by an extended X-ray source along the vertical direction or by stacked discrete x-ray sources.
Figure 22:
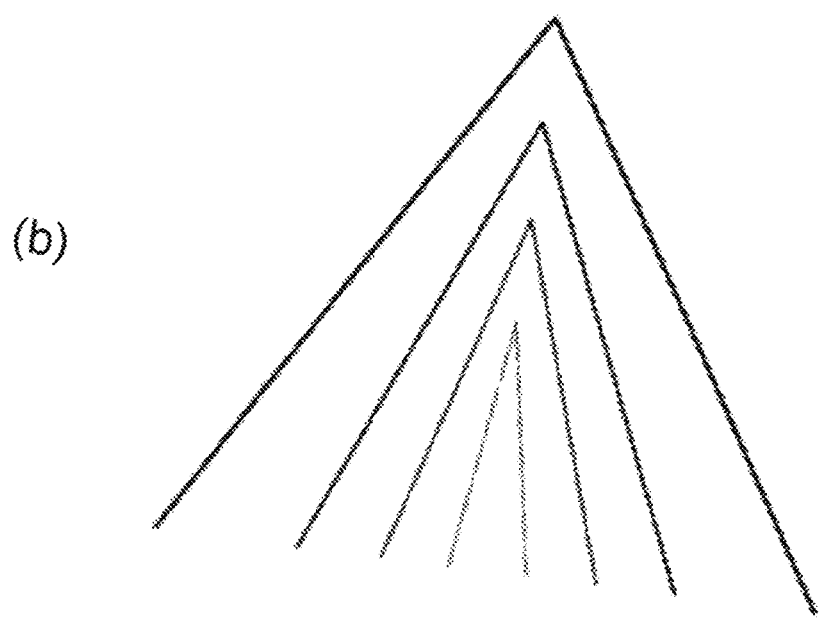

The potential for the collection of parasitic diffracted flux can be appreciated from FIG. 22, which illustrates a multi-conical shell beam system including consideration of the outermost two beams n and n−1. A sample at beam n produces diffracted flux received by its corresponding collimator at diffraction angle $2\theta_n$. However, a sample closer to the source along beam n can produce parasitic flux at diffraction angle $2\theta p_{n,n-1}$ that can be received by the diffraction collimator for beam n−1, as per the following equation $$2\theta p_{n,n-1} = 2\theta_{n-1} + \varphi_n - \varphi_{n-1} \quad (1)$$

Where the angular separation between the two conical shell interrogating beams is $\varphi_n - \varphi_{n-1}$.

It is critical that the angular distribution of the conical shell beams, diffracted flux collimators and associated diffracted flux collection heights be configured to avoid the collection parasitic rays. For example, the height $Hp_{n,n-1}$ at which parasitic diffracted flux can be collected from a sample irradiated by beam n by the collimator aimed at beam n−1 is given by $$Hp_{n,n-1} = \frac{Op_{n,n-1} \cos \varphi_n \sin\left[\left(\frac{\pi}{2}\right) - 2\theta p_{n,n-1} + \varphi_n\right]}{\sin 2\theta p_{n,n-1}} \quad (2)$$

where $$Op_{n,n-1} = S_{n,n-1} + O_{n-1}. \quad (3)$$

The separation of the two conical shell beams on the face of the collimator $S_{n,n-1}$ can be calculated from simple geometric considerations involving the chosen conical shell beam half opening angles $\varphi$ and the point source height L. The collimator offset distance $O_{n-1}$ from the corresponding shell beam is given by $$O_{n-1} = \frac{H_{n-1} \sin 2\theta_{n-1}}{\cos \varphi_{n-1} \sin\left[(\pi/2) - 2\theta_{n-1} + \varphi_{n-1}\right]} \quad (4)$$

the chosen height to collect diffracted flux is $H_{n-1}$.

To ensure that parasitic diffracted photons from a sample at beam n cannot be collected by the collimator at beam n−1 the following condition has to implemented $$Hp_{n,n-1} > H_n \quad (5)$$

and similarly for all combinations of two or more beams and their associated diffraction collimators.

This resultant configuration can be considered as a series of concentric but "independent diffraction systems" i.e. each conical shell and its corresponding collimator form a discrete system as there is nominally no diffracted flux coupling between each system.

The sizes of the inspection volume and depth or range resolution can be chosen with respect to the particular intended use of the system.

The diffracted flux collection heights can for example be arranged to be equidistant from one another to provide structural analysis at equal incremental heights throughout the working height e.g. security screening of electronic devices; distributed at different incremental distances to match better the density of sampling to any expected heterogeneity in the sample e.g. collect diffracted flux from material of interest above and or below a more strongly diffracting plane e.g. plastic explosive around a strongly diffracting copper ground plane in a printed circuit board; or arranged to be coincident at one specified plane to increase the total amount of diffracted flux from a thin sample, which could then provide increased scan speed for manufacturing applications and processes.

Similarly, the two-theta angles can be constant, or different two-theta angles can be employed to provide increased d-spacing range for example, relatively large two-theta for the softer part of the spectrum for small d-spacing analysis; and smaller two-theta for harder radiation and big d-spacing analysis.

As a further variation, one could employ more than one diffraction collimator at a different two-theta angle but different heights per conical shell beam to increase the total amount of signal collected thus improving speed and signal to noise ratio (and provide increased depth resolution).

It is also possible to employ more than one diffraction collimator at the same two-theta angle but different heights per conical shell beam to increase the total amount of signal collected thus improving speed and signal to noise ratio (and provide increased depth resolution).

Figure 23:
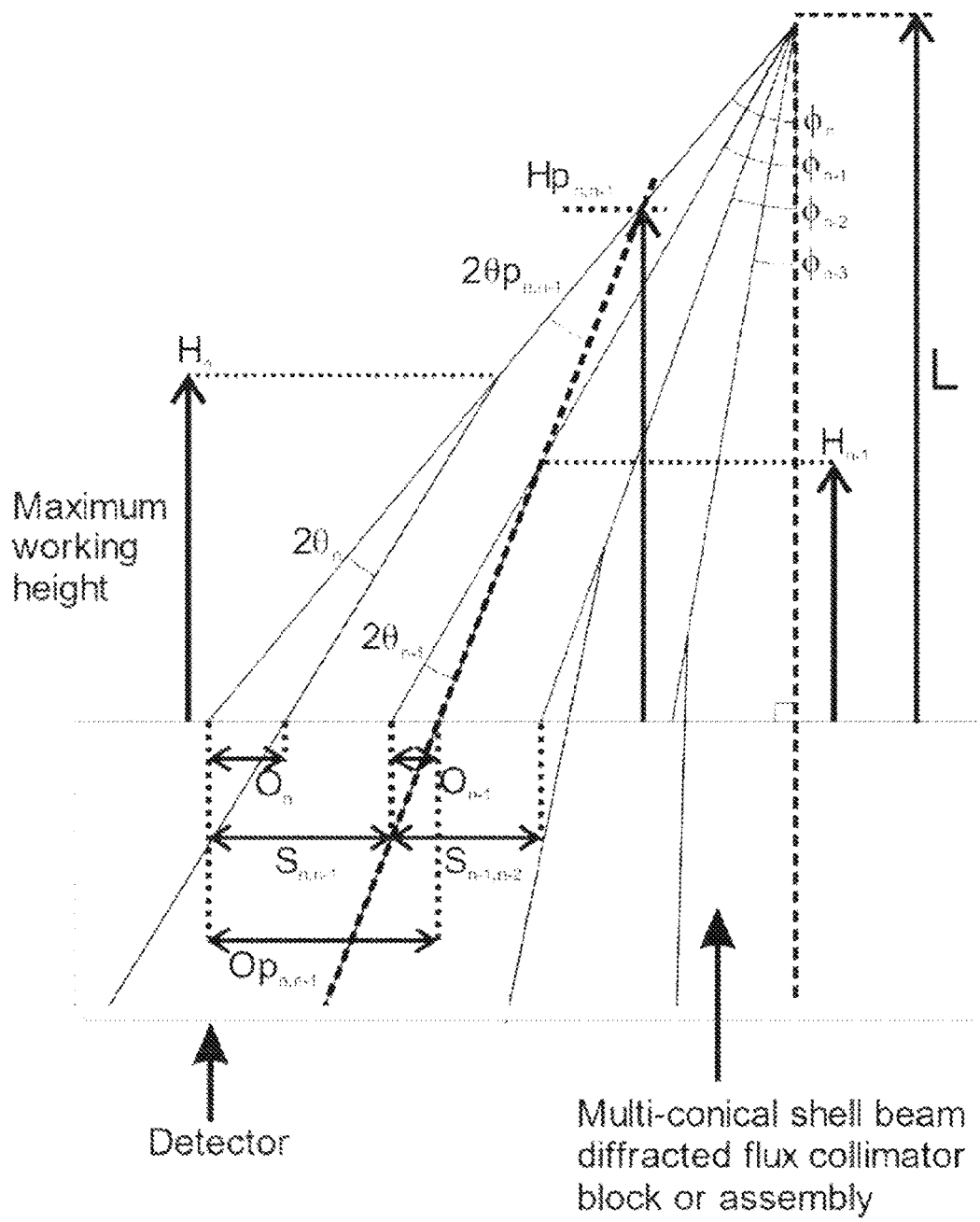
FIG. 23 illustrates further aspects of the apparatus of FIG. 21.

Furthermore, it is possible to employ diffraction collimators arranged to collect diffracted flux between the primary beam and the symmetry axis of the system as shown in FIG. 23 and/or arranged to collect diffracted flux on the opposite side (i.e. mirror image) of the primary beam in comparison to that shown in FIG. 23.

Various modifications and improvements can be made to the above without departing from the scope of the disclosure. It is to be appreciated that while references to "a sample" have been made, the disclosure can be applied to the inspection of many samples at the same time.

What is claimed is:

1. A sample inspection apparatus comprising:
    a source of electromagnetic radiation;
    a beam former for producing a plurality of coaxial and substantially conical shells of radiation, each conical shell having a different opening angle;
    a detection surface arranged to receive diffracted radiation after incidence of one or more of the conical shells upon a sample to be inspected; and
    a set of conical shell slot collimators provided at or close to the detection surface which each stare at different annular regions of different corresponding conical shells.

2. The sample inspection apparatus as claimed in claim 1, comprising a collimator body comprised of a material that substantially blocks the electromagnetic radiation and in which is formed a plurality of channels which are transparent to the electromagnetic radiation and are arranged to provide said set of conical shell slot collimators.

3. The sample inspection apparatus as claimed in claim 1, wherein a detector which provides said detection surface is an energy-resolving detector.

4. The sample inspection apparatus as claimed in claim 1, wherein the beam former comprises a set of focused circular or conical shell slits formed in an otherwise beam blocking material.

5. The sample inspection apparatus as claimed in claim 1, wherein the beam former comprises an optical element arranged to receive radiation from said source of electromagnetic radiation to form conical bands of radiation.

6. The sample inspection apparatus as claimed in claim 1, wherein each conical shell of radiation originates from a different position along a symmetry axis of the sample inspection apparatus.

7. The sample inspection apparatus as claimed in claim 1, wherein diffracted flux collection heights and/or two-theta angles conical shell slot collimators are chosen such that each conical shell slot collimator receives diffracted flux from a sample which is produced by just one conical shell beam.

8. A method of inspecting a sample, comprising:
    providing a source of electromagnetic radiation;
    providing a beam former for producing a plurality of coaxial and substantially conical shells of radiation, each conical shell having a different opening angle;
    providing a detection surface arranged to receive diffracted radiation after incidence of one or more of the conical shells upon the sample to be inspected; and
    providing a set of conical shell slot collimators provided at or close to the detection surface which each stare at different annular regions of different corresponding conical shells.

* * * * *